(12) United States Patent
Hara et al.

(10) Patent No.: US 8,760,560 B2
(45) Date of Patent: Jun. 24, 2014

(54) IMAGING APPARATUS AND METHOD OF CONTROLLING IMAGING APPARATUS FOR ADDING A SHADING TO AN IMAGE

(75) Inventors: Akihiro Hara, Tokyo (JP); Shinichi Fujii, Kanagawa (JP); Toru Shiono, Tokyo (JP); Takeshi Harano, Ibaraki (JP)

(73) Assignee: Sony Corporation, Tokyo (JP)

( * ) Notice: Subject to any disclaimer, the term of this patent is extended or adjusted under 35 U.S.C. 154(b) by 239 days.

(21) Appl. No.: 13/275,576

(22) Filed: Oct. 18, 2011

(65) Prior Publication Data

US 2012/0147212 A1    Jun. 14, 2012

(30) Foreign Application Priority Data

Dec. 13, 2010  (JP) ................................. 2010-277207

(51) Int. Cl.
*H04N 5/225*  (2006.01)
*G03B 13/00*  (2006.01)

(52) U.S. Cl.
USPC ................ 348/340; 348/333.02; 348/333.12; 348/349

(58) Field of Classification Search
USPC .............................. 348/239, 340, 333.12, 348
See application file for complete search history.

(56) References Cited

U.S. PATENT DOCUMENTS

| | | | |
|---|---|---|---|
| 8,159,559 B2* | 4/2012 | Senba | 348/229.1 |
| 2005/0073939 A1* | 4/2005 | Sakaguchi et al. | 369/125 |
| 2005/0174348 A1* | 8/2005 | Sakaguchi et al. | 345/426 |
| 2006/0066633 A1* | 3/2006 | Jeong | 345/619 |
| 2011/0037877 A1* | 2/2011 | Tamaru | 348/239 |

FOREIGN PATENT DOCUMENTS

JP    2007-124280    5/2007

\* cited by examiner

*Primary Examiner* — Ngoc-Yen Vu
(74) *Attorney, Agent, or Firm* — Oblon, Spivak, McClelland, Maier & Neustadt, L.L.P.

(57) ABSTRACT

An imaging apparatus includes: an imaging optical system having an aperture; an imaging device that outputs an image signal; an electronic shading processing portion that adds an electronic shading to a photographic image corresponding to the image signal; and a control portion which determines whether or not an optical shading can be added to the photographic image based on the imaging condition, the control portion controlling the aperture and adding the optical shading when the optical shading can be added, and the control portion controlling the electronic shading processing portion and adding the electronic shading when it is difficult to add the optical shading.

12 Claims, 16 Drawing Sheets

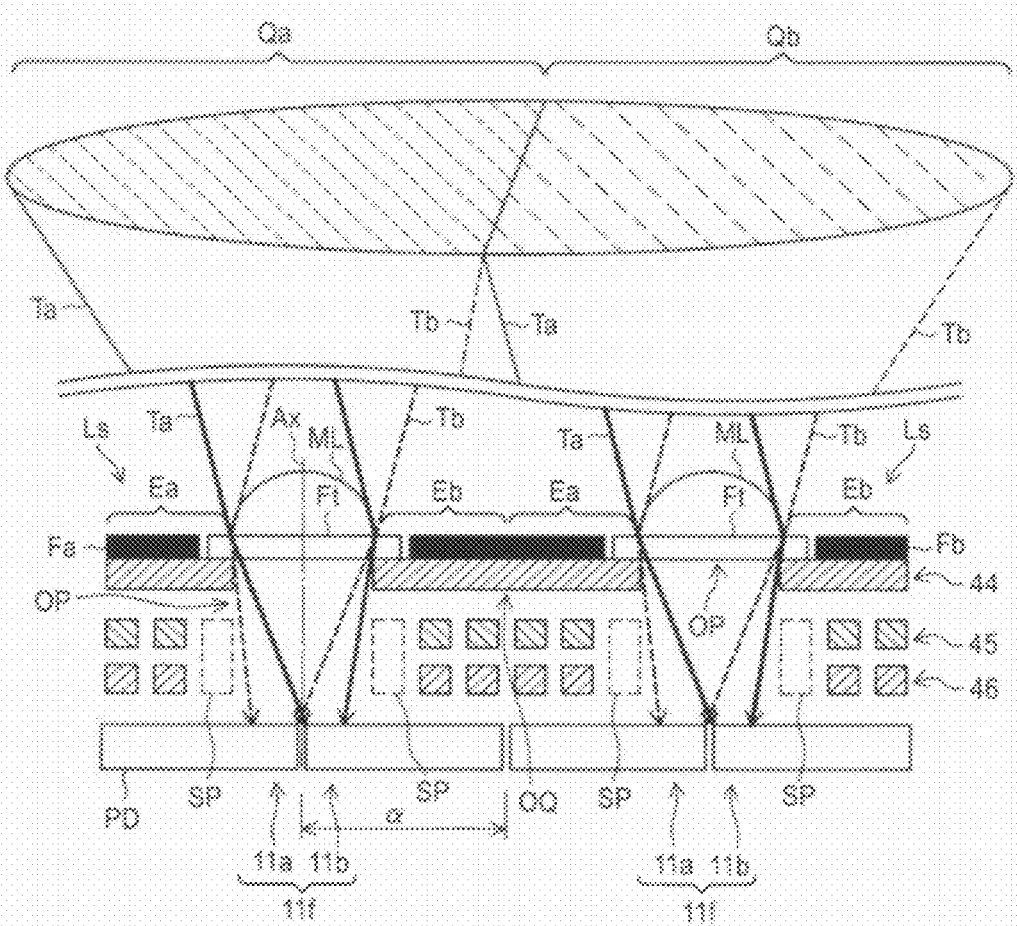

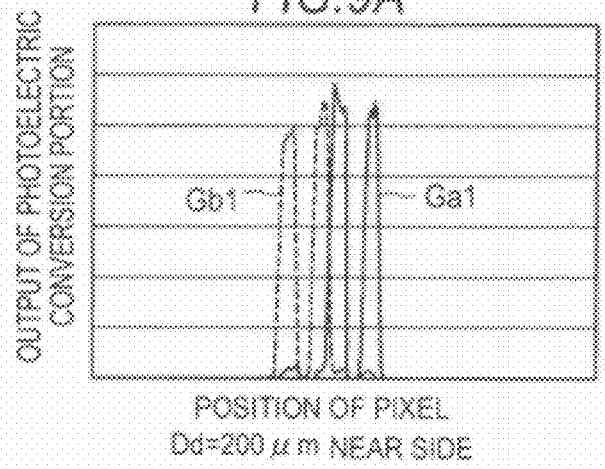
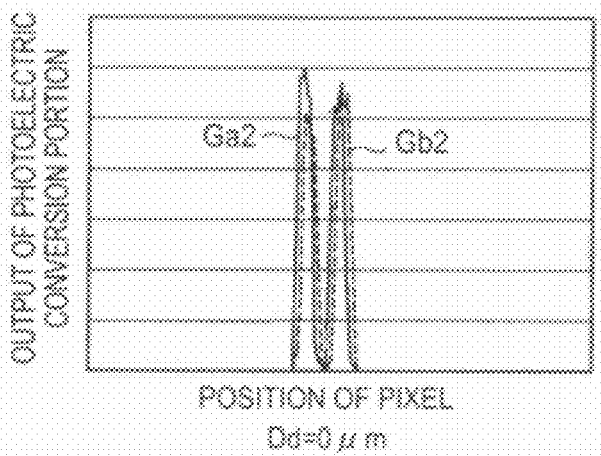
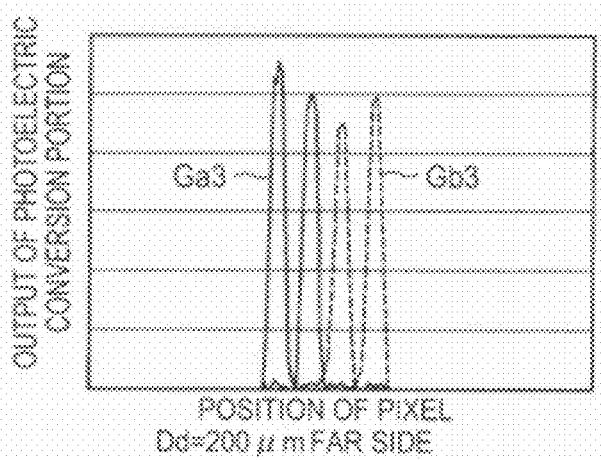

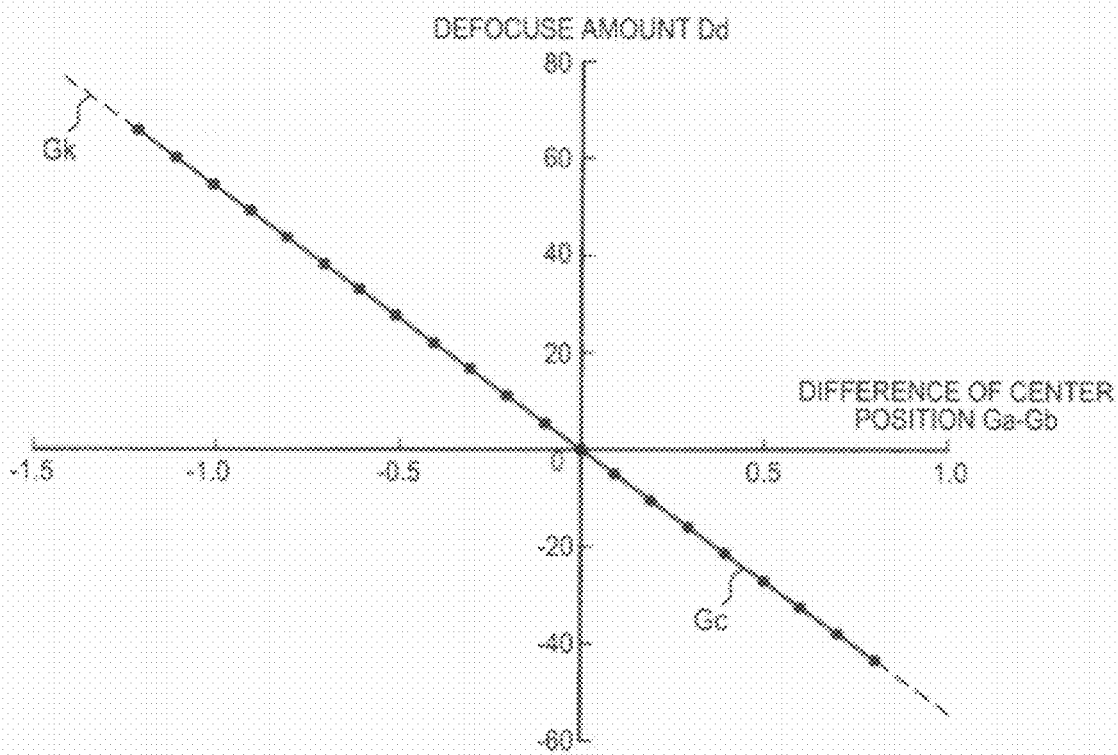

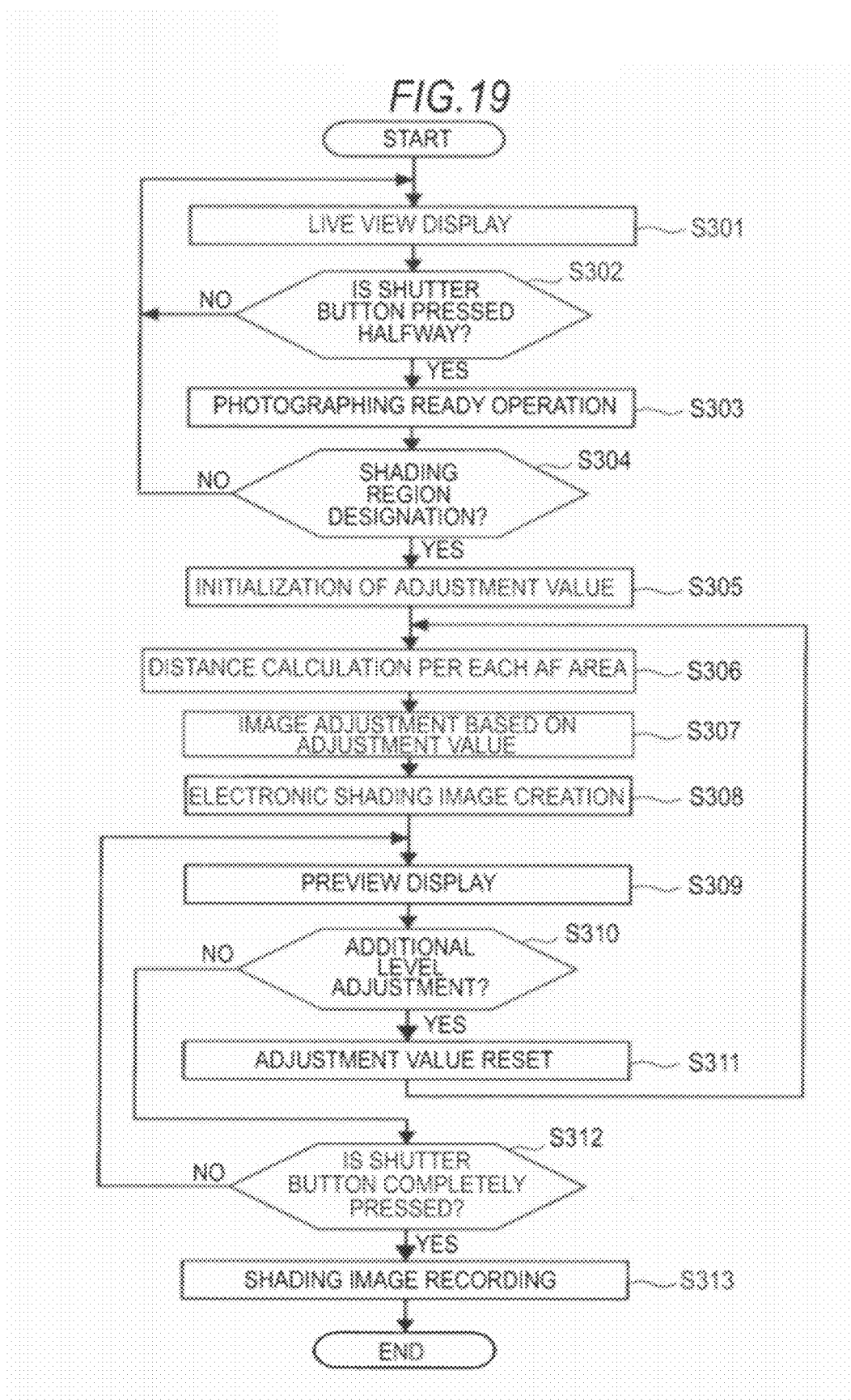

IMAGING APPARATUS AND METHOD OF CONTROLLING IMAGING APPARATUS FOR ADDING A SHADING TO AN IMAGE

FIELD

The present disclosure relates to an imaging apparatus and a method of controlling the imaging apparatus.

BACKGROUND

An imaging apparatus is commonly used which applies an electronic shading, commonly called electron shading, to a photographic imagephotographic image by processing the photographic imagephotographic image. In such an imaging apparatus, focal positions for each detection region are detected during an autofocus (AF) operation, distance data is obtained, the photographing region is divided based on the distance data, and the electronic shading is added for each divided region in a stepwise manner.

JP-A-2007-124280 is an example of the related art.

SUMMARY

However, since a boundary between the divided regions is conspicuous, an image (a shading image) to which the electronic shading is added becomes an unnatural image. To improve the quality of the shading image, there is a need to upgrade and increase the speed of the image processing performance.

Thus, it is desirable to provide an imaging apparatus capable of improving the quality of the shading image, and a method of controlling the imaging apparatus.

An embodiment of the present disclosure is directed to an imaging apparatus which includes an imaging optical system having an aperture; an imaging device that outputs an image signal; an electronic shading processing portion that adds an electronic shading to a corresponding photographic imagephotographic image; and a control portion which determines whether or not an optical shading is added to the photographic imagephotographic image based on the imaging conditions, the control portion controlling the aperture and adding the optical shading when the optical shading can be added, and the control portion controlling the electronic shading processing portion and adding the electronic shading when it is difficult to add the optical shading.

The control portion may control the aperture, add the optical shading in a range capable of being handled by the image optical system, control the electronic shading processing portion, and add the electronic shading in the remaining range, when it is possible to add the optical shading.

The control portion may calculate a shading determination value from a shading distance corresponding to a distance to a subject of a region with the shading added, a focal distance corresponding to the distance to the focused subject, and a depth of field based on the photographing condition, and when the shading determination value satisfies a shading threshold value, the control portion may determine that the optical shading can be added.

The control portion may determine that it is difficult to add the optical shading to the photographic imagephotographic image in a motion picture photographing mode or a continuous photographing mode.

The imaging apparatus may further include a display portion that displays the photographic imagephotographic image; and an operation portion in which operation information for designating a region with the shading added in the photographic imagephotographic image is input.

The display portion may display the photographic imagephotographic image with the shading added, the operation information for adjusting a degree of shading added to the photographic imagephotographic image may be input to the operation portion, and the control portion may control the aperture and/or the electronic shading and adjust a degree of shading added to the photographic imagephotographic image.

The display portion may display the degree of the shading added to the photographic imagephotographic image dividedly in regard to the optical shading and the electronic shading.

The imaging device may output a phase difference detection signal for calculating the distance information for each photographing region simultaneously with the image signal, the imaging apparatus may further include a distance information calculation portion that calculates the distance information for each photographing region based on the phase difference detection signal, and the control portion may add the photographic imagephotographic image shading based on the distance information for each photographing region.

Another embodiment of the present disclosure is directed to a method of controlling the imaging apparatus which includes determining whether or not the optical shading can be added to the photographic imagephotographic image based on the photographing condition, adding an optical shading by the adjustment of an aperture when the shading can be added, and adding an electronic shading by the adjustment of the image processing when it is difficult to add the optical shading.

Still another embodiment of the present disclosure is directed to an imaging apparatus which includes an imaging device that simultaneously outputs an image signal and a phase difference detection signal for each photographing region; a distance information calculation portion that calculates distance information for each photographing region based on the phase difference detection signal; an electronic shading processing portion that adds an electronic shading to a photographic imagephotographic image corresponding to the image signal; and a control portion that controls the electronic shading processing portion based on the distance information for each photographing region and adds the electronic shading to the photographic imagephotographic image.

The control portion may add the electronic shading to the photographic imagephotographic image in a motion picture photographing mode or a continuous photographing mode.

Yet another embodiment of the present disclosure is directed to a method of controlling the imaging apparatus which includes accruing phase difference detection signals for each photographing region that are output simultaneously with an image signal; calculating distance information for each photographing region based on the phase difference detection signals; and adding an electronic shading to the photographic imagephotographic image corresponding to the image signal based on the distance information for each photographing region.

According to the embodiments of the present disclosure, it is possible to provide an imaging apparatus capable of improving the quality of the shading image and a method of controlling the imaging apparatus.

BRIEF DESCRIPTION OF THE DRAWINGS

FIG. 8 is a longitudinal cross-sectional view for describing a configuration of an AF pixel pair;

FIGS. 9A to 9C are diagrams that show data series sensed at a left side and a right side of an exit pupil depending on a defocus amount Dd;

FIG. 10 is a diagram that shows a relationship between a difference in center positions in a pair of image rows and the defocus amount Dd;

FIG. 19 is a flow chart that shows an operation of an imaging apparatus according to a third embodiment.

DETAILED DESCRIPTION

Figure 1:
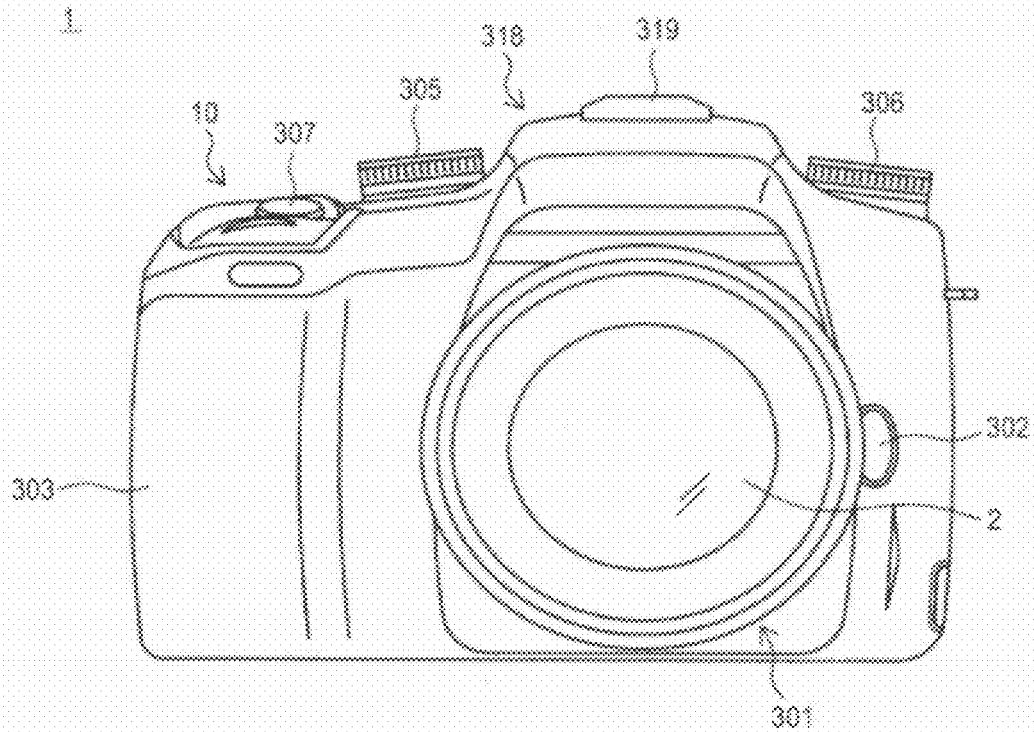
FIG. 1 is a front view of an imaging apparatus according to a first embodiment of the present disclosure.

Hereinafter, a preferred embodiment of the present disclosure will be described in detail with reference to the attached drawings. In addition, in the present specification and the drawings, the components having substantially the same function are denoted by the same reference numerals and overlapping descriptions thereof will be omitted.

[1. Configurations of Major Parts of Imaging Apparatus]

Figure 2:
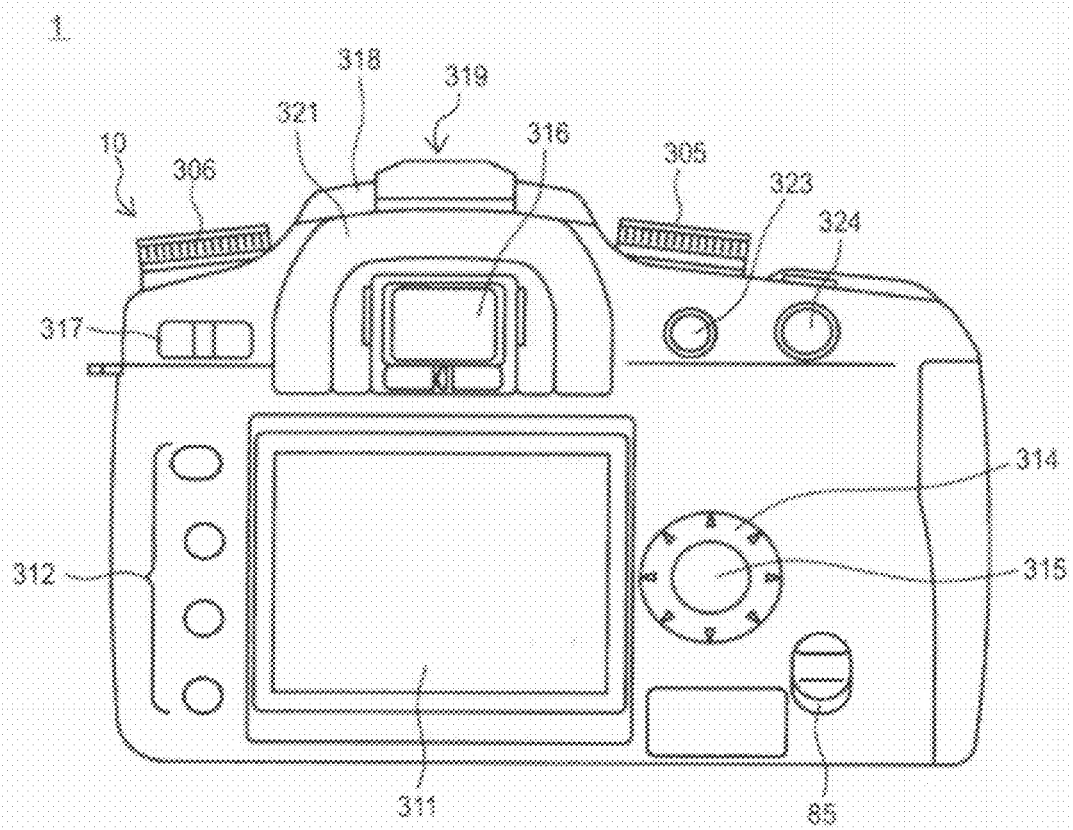
FIG. 2 is a rear view of the imaging apparatus.

FIGS. 1 and 2 are diagrams that show exterior configurations of an imaging apparatus 1 according to an embodiment of the present disclosure. Herein, FIGS. 1 and 2 show a front view and a rear view, respectively.

The imaging apparatus 1 is configured as one eye reflex lens type digital still camera, and includes a camera body 10 and an exchangeable lens 2 as a photographing lens that is freely attachable to and detachable from the camera body 10.

In FIG. 1, on the front side of the camera body 10, a mount portion 301, a lens exchanging button 302, a grip portion 303, a mode setting dial 305, a control value setting dial 306, and a shutter button 307.

Furthermore, in FIG. 2, on the rear side of the camera body 10, an LCD 311 (a liquid crystal display) 311, a setting button group 312, a ten key 314, and a push button 315 are provided. Furthermore, on the rear side of the camera body 10, an EVF 316 (an electronic viewfinder) 316, an eye cup 321, a main switch 317, an exposure correction button 323, an AE lock button 324, a flash portion 318, and a connection terminal portion 319.

The mount portion 301 is provided with a connector Ec (see FIG. 4) for carrying out an electrical connection with the exchangeable lens 2, or a coupler 75 (see FIG. 4) for performing a mechanical connection. The lens exchangeable button 302 is pushed down when detaching the exchangeable lens 2 mounted on the mount portion 301. The grip portion 303 is grasped by a user during photographing.

The mode setting dial 305 and the control value setting dial 306 are formed of an approximately disk-shaped member that can be rotated in a plane approximately parallel to the upper surface of the camera body 10. The mode setting dial 305 is used so as to alternatively select the mode or the function of the imaging apparatus 1 of an auto exposure (AE) mode, or an auto focus (AF) control mode, various photographing modes such as a still image photographing mode, a motion picture photographing mode, and a continuous photographing mode, an image playback mode or the like. Meanwhile, the control value setting dial 306 is used so as to set the control values to various functions mounted on the imaging apparatus 1.

The shutter button 307 can perform the operation of "a half-pressed state" that is pressed halfway, and the operation of "a full-pressed state" that is further pressed. In the still image photographing mode, when the shutter button 307 is pressed halfway, a ready operation (ready operations such as the setting of the exposure control value or the focus detection) for photographing the still image of a subject is performed. Moreover, when the shutter button 307 is fully pressed, the photographing operation (a series of operations in which the imaging device 101 (see FIG. 3) is exposed, and an image signal obtained by the exposure is subjected to a predetermined image processing and is recorded on a memory card or the like) is executed.

The LCD 311 includes a color liquid crystal panel capable of displaying images, performs the display of the captured image, the playback display of the recorded image or the like, and displays the setting screen of the function or the mode mounted on the imaging apparatus 1.

The setting button group 312 is used so as to operate various functions of the imaging apparatus 1. The setting button group 312 includes, for example, a selection confirmation switch for confirming the content selected in a menu screen to be displayed on the LCD 311, a selection cancellation switch, a menu display switch that changes the content of the menu screen, a display on/off switch, a display expansion switch or the like.

The ten key 314 has a ring-shaped member including a plurality of pressing portions (triangular portions in the drawings) disposed in a circumferential direction at regular intervals and is configured such that the pressing operations on each pressing portion are detected. Furthermore, the push button 315 is disposed in the middle of the ten key 314. The ten key 314 and the push button 315 are used so as to input the instructions such as the alteration of the photographing magnification (the movement of the zoom lens (see FIG. 4) of the zoom lens 212), the playback frame advance of the recorded image, and photographing condition (the aperture value, the shutter speed, presence or absence the flash light emission or the like), and the setting of the shading conditions.

The EVF 316 includes a liquid crystal panel 310 (see FIG. 3) and performs the display of the image captured by the imaging device 101 (see FIG. 3), the playback display of the recorded image or the like. In the EVF 316 or the LCD 311, a live view display (a preview) display is performed in which a subject is displayed in the shape of a motion picture based on the image signals that are sequentially created by the imaging device 101 before the main photographing (the image recording photographing).

The main switch 317 includes slide switches of two contacts sliding left and right and is used so as to turn the power source of the imaging apparatus 1 on/off.

The flash portion 318 is constituted as a popup type built-in flash. Meanwhile, when an external flash or the like is attached to the camera body 10, the connection is performed using a connection terminal portion 319.

The eye cup 321 is a "U"-shaped light shielding member that has a light shielding property and suppresses the entry of the external light to the EVF 316. The exposure correction button 323 is used so as to manually adjust the exposure value (the aperture value or the shutter speed), and the AE lock button 324 is used so as to fix the exposure.

The exchangeable lens 2 functions as a lens window that takes in light (light image) from a subject, and functions as an imaging optical system that guides the subject light to the imaging device 101 disposed inside the camera body 10. The exchangeable lens 2 can be detached from the camera body 10 by pressing down the lens exchanging button 302.

Figure 3:
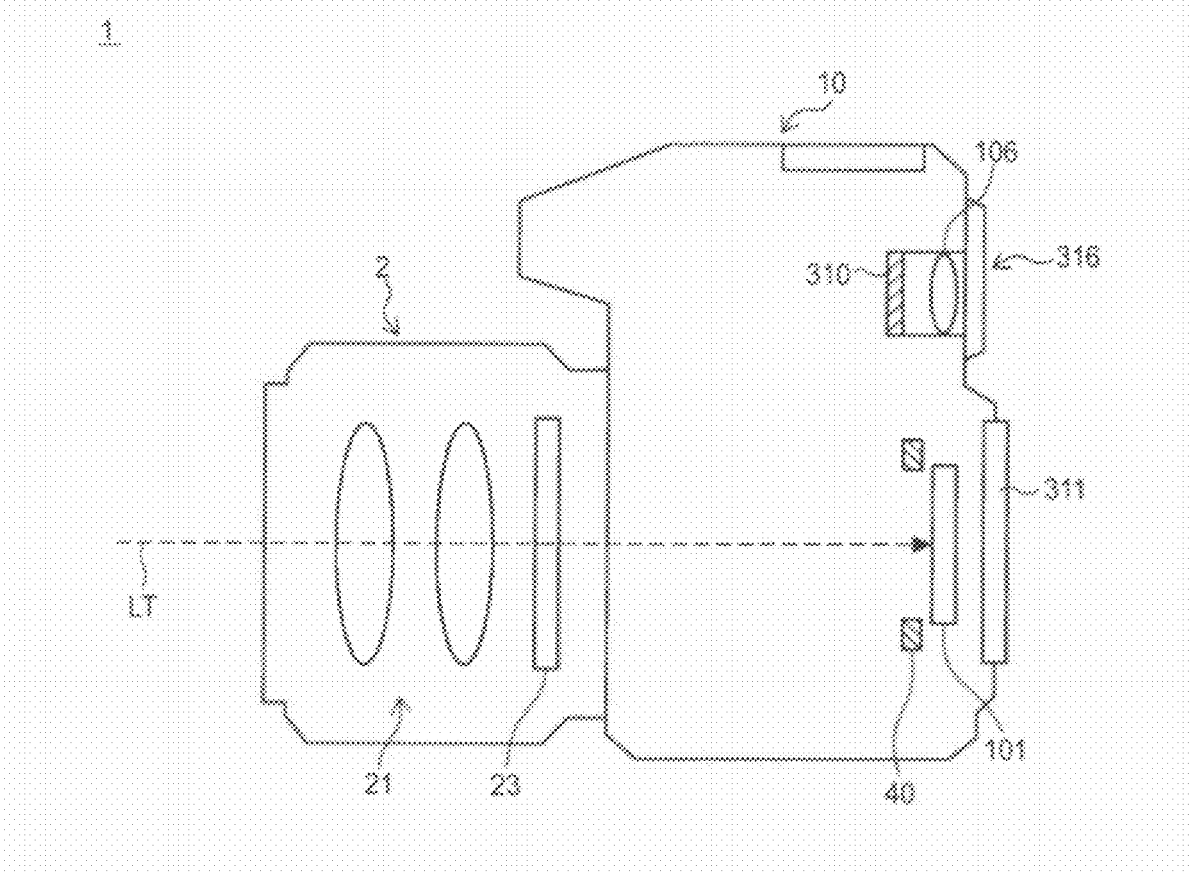
FIG. 3 is a longitudinal cross-sectional view of the imaging apparatus.
Figure 4:
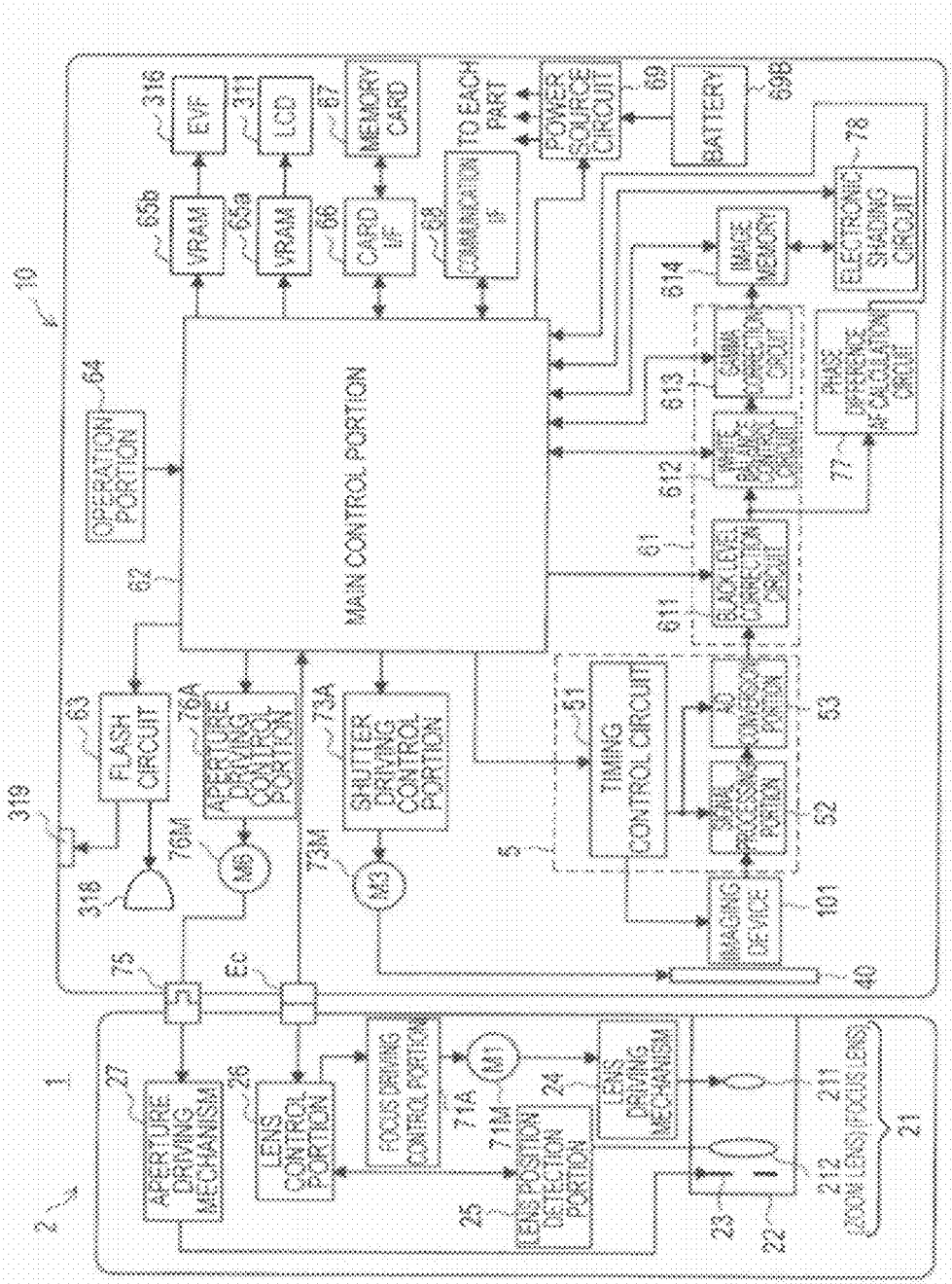
FIG. 4 is a block diagram that shows an electric configuration of the imaging apparatus.

The exchangeable lens 2 includes a lens group 21 having a plurality of lenses disposed along an optical axis LT (see FIG. 4). The lens group 21 includes a focus adjusting focus lens 211 (see FIG. 4), and a zooming zoom lens 212 (see FIG. 4). The focus adjustment or the zooming is performed by driving the focus lens 211 or the zoom lens 212 in the direction of the optical axis LT (see FIG. 3). Furthermore, the exchangeable lens 2 is equipped with an operation ring, which is rotatable along an outer peripheral surface, on an outer periphery of a lens barrel in place. The zoom lens 212 is moved in the optical axial direction depending on the rotation direction or the amount of rotation by a manual operation or an automatic operation, whereby the zoom magnification (the photographing magnification) depending on the position of the movement place is set.

[2. Internal Configuration of Imaging Apparatus]

Next, an internal configuration of the imaging apparatus 1 will be described. FIG. 3 is a longitudinal cross-sectional view of the imaging apparatus 1. As shown in FIG. 3, the inner portion of the camera body 10 is equipped with the imaging device 101, the EVF 316 or the like.

The imaging device 101 is disposed in a direction perpendicular to the optical axis LT of the lens group included in the exchangeable lens 2 mounted on the camera body 10. The imaging device 101 is a CMOS color area sensor (a CMOS type imaging device 101) in which, for example, a plurality of pixels is two-dimensionally disposed in a matrix shape. The imaging device 101 creates electric analog signals (image signals) of each color component of R (red), G (green), and B (blue) concerning the object light flux received through the exchangeable lens 2 and outputs the signals as image signals of R, G, B each color.

The shutter unit 40 is disposed in front of the optical axis direction of the imaging device 101. The shutter unit 40 includes a blade member moved in the up and down direction, and is configured as a mechanical focal plane shutter that performs the optical path opening/blocking of the subject light guided to the imaging device 101 along the optical axis LT.

The EVF 316 includes a liquid crystal panel 310 and an eyepiece 106. The liquid crystal panel 310 is, for example, configured as a color liquid crystal panel, and displays the image captured by the imaging device 101. The eyepiece 106 guides the subject image displayed on the liquid crystal panel 310 to the outside of the EVF 316.

[3. Electric Configuration of Imaging Apparatus]

FIG. 4 is a block diagram that shows an electric configuration of the imaging apparatus 1. Herein, the same elements as FIGS. 1 to 3 are denoted by the same reference numerals.

Firstly, the electric configuration of the exchangeable lens 2 will be described. The exchangeable lens 2 includes a lens driving mechanism 24, a lens position detection portion 25, a lens control portion 26, and an aperture driving mechanism 27, in addition to the lens group 21 constituting the imaging optical system.

In the lens group 21, the focus lens 211, the zoom lens 212, and the aperture 23 for adjusting the incident quantity of light to the imaging device 101 are held in the optical axis LT (FIG. 3) direction. The lens group 21 incorporates the light image of a subject and performs the image formation thereof in the imaging device 101. In the AF control, the focus lens 211 is driven in the optical axis LT direction by the AF actuator 71M in the exchangeable lens 2 to control the focus.

The focus driving control portion 71A creates the driving control signal for the AF actuator 71M based on the AF control signal from the lens control portion 26 so as to move the focus lens 211 to the focal position. The AF actuator 71M includes a step motor or the like and supplies the lens driving mechanism 24 with the driving force.

The lens driving mechanism 24 is constituted by, for example, a helicoid, a gear for rotating the helicoid or the like, receives the driving force from the AF actuator 71M, and drives the focus lens 211 or the like in a direction parallel to the optical axis LT.

The lens position detection portion 25 includes an encode plate in which a plurality of code patterns is formed in the optical axis LTR direction at a predetermined pitch, and an encoder brush which is moved integrally with the lens while coming into sliding-contact with the encode plate, and detects an amount of movement upon controlling the focus of the lens group 21.

The lens control portion 26 is constituted by a microcomputer equipped with a memory for memorizing a control program or a control data. The lens control portion 26 communicates with the main control portion 62, for example, via a connector Ec. The lens control portion 26 sends, for example, the state information data such as the focus distance of the lens group 21, the injection pupil distance, the aperture value, the focal distance Df, and the peripheral amount of light state, or the position information of the focus lens 211, and receives, for example, an amount of driving state information data of the focus lens 211.

The aperture driving mechanism 27 receives the driving force from the aperture driving actuator 76M via a coupler 75 and alters the aperture diameter of the aperture 23.

Next, the electric configuration of the camera body 10 will be described. The camera body 10 includes an AFE (an analog front end) 5, an image processing portion 61, an image memory 614, a main control portion 62, a flash circuit 63, an operation portion 64, a VRAM 65 (65a and 65b), a card-interface (I/F) 66, and a memory card 67, in addition to the imaging device 101, the shutter unit 40 or the like. Furthermore, the camera body 10 includes a communication interface (I/F) 68, a power source circuit 69, a battery 69B, a shutter driving control portion 73A, a shutter driving actuator 73M, an aperture driving control portion 76A, and an aperture driving actuator 76M.

The imaging device 101 is constituted by a CMOS color area sensor, and the imaging operations such as the starting (and the ending) of the exposure operation, the output selections of each pixel, and the reading of the pixel signal are controlled by the timing control circuit 51.

The AFE 5 gives the imaging device 101 the timing pulse, performs a predetermined signal processing on the image signal output from the imaging device 101, converts the image signal into a digital signal, and outputs the digital signal to the image processing portion 61. The AFE 5 includes the timing control circuit 51, the signal processing portion 52, the A/D conversion portion 53 or the like.

The timing control circuit 51 creates a predetermined timing pulse based on a standard clock from the main control portion 62, outputs the timing pulse to the imaging device 101, and controls the imaging operation of the imaging device 101. Furthermore, the timing control circuit 51 outputs a predetermined timing pulse to the signal processing portion 52 or the A/D conversion portion 53, and controls the operation of the signal processing portion 52 and the A/D conversion portion 53.

The signal processing portion 52 performs a predetermined analog signal processing on the analog image signal from the imaging device 101. The signal processing portion 52 includes a CDS (correlated double sampling) circuit, an AGC (auto gain control) circuit, a clamp circuit or the like. The A/D conversion portion 53 converts the analog image signals of R, G, and B output from the signal processing portion 52 into digital image signals formed of a plurality of bits (for example, 12 bits) based on the timing pulse to be output from the timing control circuit 51.

The image processing portion 61 performs a predetermined signal processing on the image data from the AFE 5 to make the image file. The image processing portion 61 includes a black level correction circuit 611, a white balance control circuit 612, a gamma correction circuit 613 or the like. In addition, the image data incorporated in the image processing portion 61 is written on the image memory 614 in synchronization with the reading of the imaging device 101, and then is accessed and processed by each block of the image processing portion 61.

The black level correction portion 611 corrects the black levels of each digital image signal of R, G, and B, which are subjected to the A/D conversion by the A/D conversion portion 53, to the standard black level. The white balance correction circuit 612 performs the level conversion of the digital signals of each color component of R, G, and B based on the white standard depending on the light source. The gamma correction circuit 613 corrects the grayscale characteristic of the image data subjected to the WB adjustment.

The image memory 614 temporarily memorizes the image data from the image processing portion 61 during photographing mode, and is used as a working region for performing a predetermined processing on the image data. Furthermore, the image memory 614 temporarily memorizes the image data read from the memory card 67 during playback mode.

The main control portion 62 includes, for example, a microcomputer equipped with a memory portion such as a ROM memorizing the control program or a RAM temporarily memorizing the data, and controls the operations of each portion of the imaging apparatus 1.

The flash circuit 63 controls the amount of light emission of the flash portion 318 or an external flash to be connected to the connection terminal portion 319 to an amount of light emission set by the main control portion 62.

The operation portion 64 includes a mode setting dial 305, a control value dial 306, a shutter button 307, a setting button group 312, a ten key 314, a push button 315, a main switch 317 or the like, and is used so as to input the operation information to the main control portion 62.

The VRAMs 65a and 65b have image signal memory capacities corresponding to the number of pixels of the LCD 311 and the EVF 316, and function as buffer memories between the main control portion 62, the LCD 311 and the EVF 316. The card I/F 66 is an interface for enabling the sending and receiving of signals between the memory card 67 and the main control portion 62. The memory card 67 is a recording medium that preserves the image data created by the main control portion 62. The communication I/F 68 is an interface for enabling the sending of the image data and the like between the communication I/F 68 and a personal computer or other external devices.

The power source circuit 69 is formed of, for example, a constant voltage circuit, and creates the voltage for driving the entire imaging apparatus 1 such as the control portion such as the main control portion 62, the imaging device 101, and other various driving portions. The battery 69B is formed of a primary battery such as an alkali dry cell, and a secondary battery such as a nickel metal hydride, and supplies the entire imaging apparatus 1 with the electric power.

The shutter driving control portion 73A creates the driving control signal from the shutter driving actuator 73M based on the control signal from the main control portion 62. The shutter driving actuator 73M drives the opening and the closing of the shutter unit 40.

The aperture driving control portion 76A creates the driving control signal for the aperture driving aperture 76M based on the control signal from the main control portion 62. The aperture driving actuator 76M gives the aperture driving mechanism 27 the driving force via the coupler 75.

Furthermore, the camera body 10 is equipped with a phase difference AF calculation circuit 77 that performs the calculation necessary for the AF control using the imaging device 101 based on the black revel corrected image data from the black level correction circuit 611. Furthermore, the camera body 10 is equipped with an electronic shading circuit 78 that adds electronic shading of different levels depending on the distance for each photographing region to the image data by the image processing using a shading filter.

[4. Phase Difference AF Operation]

Figure 5:
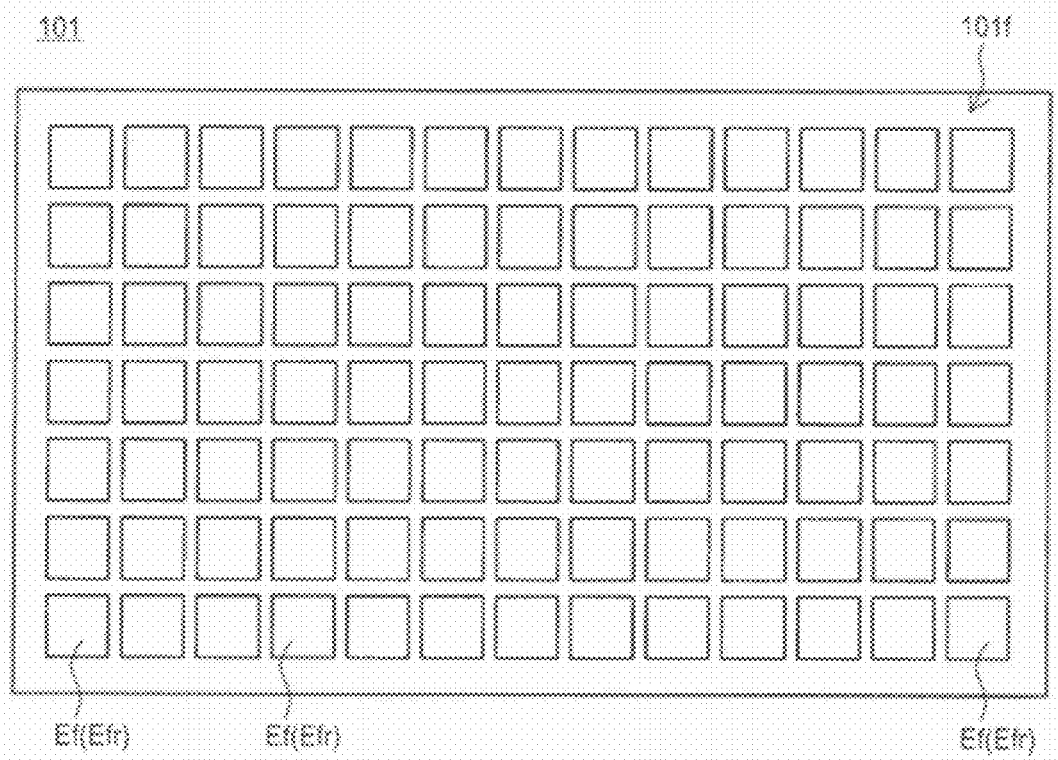
FIG. 5 is a diagram for describing the configuration of the imaging device.
Figure 6:
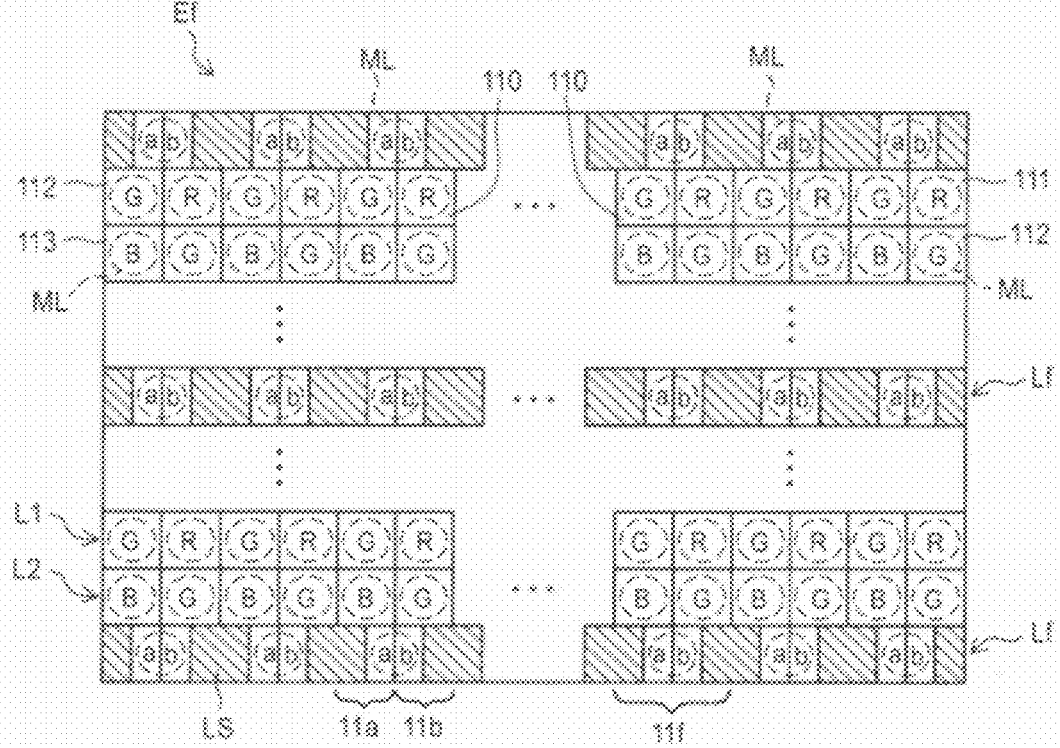
FIG. 6 is a diagram for describing the configuration of the imaging device.

The imaging apparatus 1 performs the focus detection (the phase difference AF) of the phase difference detection method by sensing the transmission light transmitting the different portions of the injection pupil. FIGS. 5 and 6 are diagrams for describing the configuration of the imaging device 101. The imaging device 101 performs the phase difference AF on each of a plurality of AF areas Ef defined in the matrix shape on the imaging surface 101f.

The AF area Ef is provided with common pixels (common pixel) 110 formed of a R pixel 111, a G pixel 112 and a B pixel 113 in which color filters of R (red), G (green), and B (blue) are installed between a micro lens ML (a dotted-circle) and a photodiode. Furthermore, the Af area Ef is provided with a pair of pixels 11f (an AF pixel pair) that realizes the pupil division function so as to perform the phase difference AF. In the AF area Ef, image information is acquired by the common pixel 110 having a number of pixels greater than the pixels of the pair of AF pixels 11f.

Moreover, the AF area Ef is formed with, as a horizontal line (common pixels line) of the common pixel 110, a Gr line L1 in which the G pixel 112 and the R pixel 111 are alternately disposed in the horizontal direction, and a Gb line L2 in which the B pixel 113 and the G pixel 112 are alternately disposed in the horizontal direction.

Furthermore, in the Af area Ef, by repeatedly arranging the AF pixel pair 11f including one micro lens ML having the same configuration (the diameter and the curvature) as the common pixel 110 in the horizontal direction, the AF line Lf is periodically formed in the vertical direction.

Figure 7:
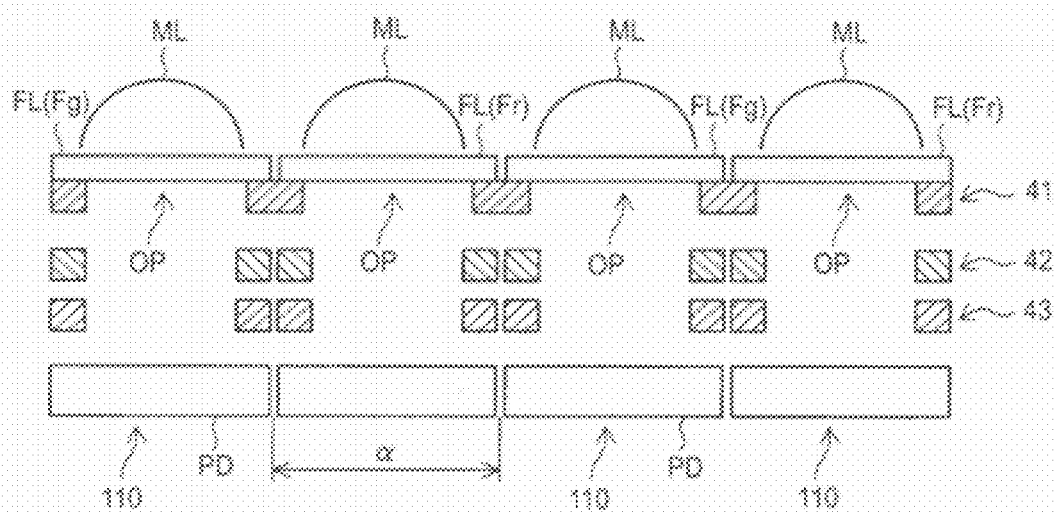
FIG. 7 is a longitudinal cross-sectional view for describing a configuration of common pixels.

FIG. 7 is a longitudinal cross-sectional view for describing the configuration of the common pixel 110. In addition, the arrangement of the common pixel 110 shown in FIG. 7 is provided, for example, in the Gr line L1.

In the arrangement of the common pixel 110, the micro lenses ML are provided above a plurality of photoelectric conversion portions (photodiodes) PD disposed along the horizontal direction by pitch α, respectively. Between the micro lens ML and the photoelectric conversion portion PD, a first metal 41, a second metal 42, and a third metal 43 are sequentially installed from the upside. Herein, the second metal 42 and the third metal 43 are configured as signal wiring, and the first metal 41 is configured as a grounding surface.

The color filter FL is installed on the first metal 41, and the micro lens ML is provided on the color filter FL. In the color filter FL, for example, a green filter Fg and a red filter Fr are alternately disposed on the arrangement of the common pixel 110 disposed in the Gr line L1. Furthermore, in the arrangement of the common pixel 110, portions between the respective micro lenses ML are shielded by the first metal 41 such that the unnecessary light passing through the respective micro lenses ML is not sensed by the photoelectric conversion portion PD.

FIG. 8 is a longitudinal cross-sectional view for describing the configuration of the AF pixel pair 11f. In addition, the arrangement of the AF pixel pair 11f shown in FIG. 8 is provided in the AF line Lf shown in FIG. 6.

As shown in FIG. 8, the AF pixel pair 11f is constituted by a pair of pixels 11a and 11b in which a pair of photoelectric conversion portions PD is disposed across the optical axis AX of the micro lens ML so as to divide (a pupil division) the light flux Ta from the left side portion Qa from the light flux Tb from the right side portion Qb of the injection pupil. The pair of photoelectric conversion portions PD has the same size as that of the photoelectric conversion portion PD of the common pixel 110, respectively, and is disposed adjacent to each other by the same pitch α, as the common pixel 110.

In the AF line Lf, the light shielding by the first metal 44 is performed on the opening OP of the first metal 41 formed in the arrangement of the common pixel 110 by one interval. In the arrangement of the common pixel 110 shown in FIG. 7, a place OQ formed with the opening OP is blocked by the first metal 44, and a black filter (a black filter) Fb of black is mounted thereon at a one pixel interval.

In the AF pixel pair 11f, above the pair of photoelectric conversion portions PD, the light shielding portion LS formed with two light shielding regions Ea and Eb that includes the first metal 44 and the black filter Fb form in the place OQ and shields the light flux passing through the injection pupil, is arranged. Furthermore, in the AF line Lf, as a color filter provided on the opening OP of the first metal 44, a transparent filter Ft is adopted.

By the AF pixel pair 11f having such a configuration, the pupil division in the injection pupil, that is, the light flux Ta from the left side portion Qa of the injection pupil is sensed by the photoelectric conversion portion PD of the second AF pixel 11b, and the light flux Tb from the right side portion Qb of the injection pupil is sensed by the photoelectric conversion portion PD of the first AF pixel 11a.

Hereinafter, the light sensing data obtained by the first AF pixel 11a is called A series data, and the light sensing data obtained by the second AF pixel 11b is called B series data. Moreover, for example, the principle of the phase difference AF will be described with reference to FIGS. 9A to 9C that show the A series data and the B series data obtained from the group of the AF pixel pairs 11f disposed in any one AF line Lf (FIG. 6).

FIGS. 9A to 9C are diagrams that show simulation results of a state in which the focus surface is defocused at a side near the imaging surface 101f of the imaging device 101 at a distance of 200 μm (FIG. 9A), a focal state in which the focus surface matches the imaging surface 101f (FIG. 9B), and a state in which the focus surface is defocused at a side far from the imaging surface 101f at a distance of 200 μm (FIG. 9C). Herein, in FIGS. 9A to 9C, a transverse axis indicates the pixel positions of the first AF pixel 11a and the second AF pixel 11b in the AF line Lf direction, and a longitudinal axis indicates the output of each of the first AF pixel 11a and the second AF pixel 11b from the photoelectric conversion portion PD. Furthermore, in FIGS. 9A to 9C, graphs Ga1 to Ga3 (solid lines) indicate the A series data, and graphs Gb1 to Gb3 (dotted lines) indicate the B series data.

When referring to FIGS. 9A to 9C, it is understood that, as a defocus amount Dd is greater, a shift amount (a deviation amount) of the AF line Lf (the horizontal direction) generated between the image row of the A series (the graphs Ga1 to Ga3) and the image row of the B series (the graphs Gb1 to Gb3) is increased.

A relationship between the shift amount and the defocus amount Dd in the pair of image rows (the image rows of the A series and the B series) is shown by graph Gc as shown in FIG. 10. In FIG. 10, a transverse axis indicates a difference (a pixel pitch) in central position of the image row of the B series to the central position of the image row of the A series, and a longitudinal axis indicates the defocus amount Dd (μm). In addition, the center position Xg of each image row is obtained, for example, from formula (1).

$$Xg = (X1\,Y1 + X2\,Y2 + \ldots + Xn\,Yn)/(Y1 + Y2 + \ldots + Yn) \quad (1)$$

In formula (1), X1 to Xn indicate the pixel positions from the left end, for example, in the AF line Lf, and Y1 to Yn indicate output values from the first AF pixel 11a and the second AF pixel 11b of the respective positions X1 to Xn.

Like the graph Gc shown in FIG. 10, a difference in the central position in the pair of image rows and the defocus amount Dd are in a proportional relationship to each other. The relationship is indicated as formula (2) by setting the defocus amount Dd as Dd (μm) and a difference in central positions as C (μm).

$$Dd = k \times C \quad (2)$$

Herein, factor k of formula (2) indicates a slope Gk (a dotted line) of the graph Gc of FIG. 10, and can be acquired by a factory test and the like in advance.

From the above, after a difference (a phase difference) in central positions concerning the A series data and the B series data obtained from the AF pixel pair 11f is obtained from the phase difference AF calculation circuit 77, the defocus amount Dd is calculated from formula (2), and the driving amount corresponding to the calculated defocus amount Dd is given to the focus lens 211, whereby an auto focus (AF) control is possible which moves the focus lens 211 to the detected focus position. In addition, the relationship between the defocus amount Dd and the focus lens 211 is uniquely defined by a design value of the exchangeable lens 2 mounted on the camera body 10.

[5. Operation of Imaging Apparatus According to First Embodiment]

Figure 11:
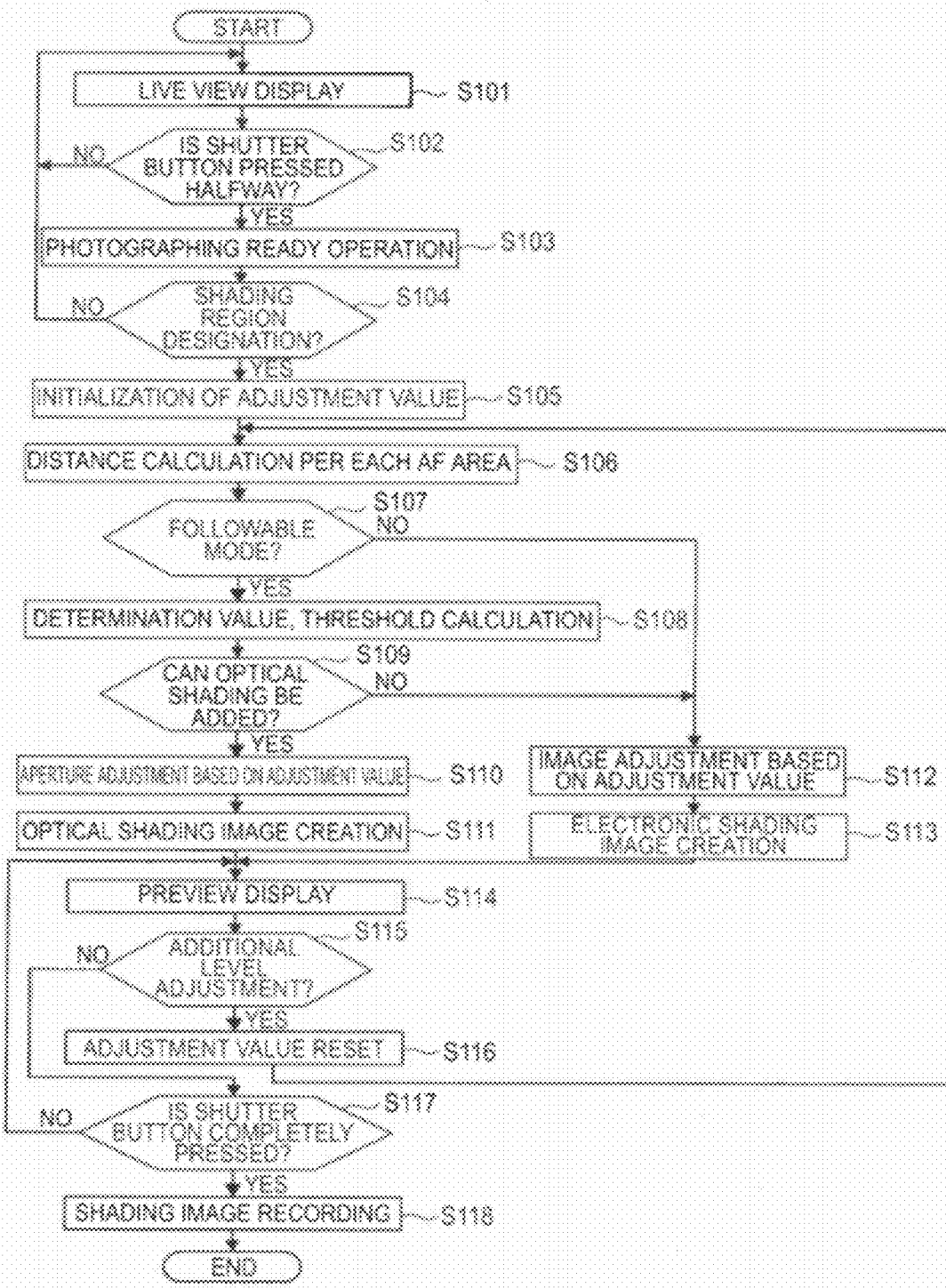
FIG. 11 is a flow chart that shows an operation of the imaging apparatus according to the first embodiment.

FIG. 11 is a flow chart that shows an operation of the imaging apparatus 1 according to the first embodiment of the present disclosure.

The imaging apparatus 1 displays a live view in the photographing mode (step S101). In the live view display, the image before the photographing is displayed in a video-like manner depending on a photographing operation such as panning, tilting, and zooming. For the live view display, the imaging device 101 performs the imaging operation depending on the timing pulse from the AFE 5, the AFE 5 creates the image data from the image signal, and the image processing portion 61 processes the image data and supplies the same to the image memory 614. The phase difference AF calculation circuit 77 obtains the distance to the subject for each AF area Ef from the phase difference detection signal output simultaneously with the image signal, and supplies the distance to the image memory 614. The main control portion 62 sends the image data from the image memory 614 to the VRAMs 65a and 65b, and the LCD 311 and the EVF 316 display the image before the photographing in a video-like manner.

When a user performs a half-push operation of the shutter button 307, the main control portion 62 detects the half-pressing state based on the operation information from the operation portion 64 (S102). The main control portion 62 performs the photographing ready operation upon detecting the half-pressing state (S103), and continues to display the live view when not detecting the half-pressing state (S101). As the photographing ready operation, the main control portion 62 performs the AF control by the focus detection of the phase difference detection method. Furthermore, the main control portion 62 temporarily fixes the photographing conditions such as the aperture (F) value of the lens, the focus distance, the ISO sensitivity, and the shutter speed.

The main control portion 62 creates the AF control signal from the defocus amount Dd of the AF area Ef corresponding to the main subject and supplies the focus driving control portion 71A with the same. The focus driving control portion 71A creates the driving control signal based on the AF control signal, and the lens driving mechanism 24 drives the focus lens 211 by the driving force given from the AF actuator 71M based on the driving control signal. As a result, the AF control by the phase difference detection method is performed, and the focus lens 211 is moved to the focus position. Furthermore, the main control portion 62 the image data indicating the AF range Ff to the VRAMs 65a and 65b so as to correspond to the focus position. As a result, the live view image is displayed together with the AF range Ff on the LCD 311 and the EVF 316.

The main control portion 62 has a luminance determination function, an aperture value setting function, and a shutter speed setting function so as to set the exposure control value (the aperture value, and the shutter speed). The luminance determination function is a function that is incorporated by the imaging device 101 and determines the brightness of the subject using the image data memorized in the image memory 614. The aperture value function and the shutter speed setting function set the aperture value and the shutter speed based on the determination result of the brightness of the subject by the luminance determination and the AE program in the program AE mode. In an aperture priority mode, the shutter speed is set from the brightness of the subject and the preset aperture value, and in the shutter priority mode, the aperture value is set from the brightness of the subject and the preset shutter speed.

A user operates the setting button 312 or the like so as to select a shading region designation mode. The main control portion 62 detects the selection of the shading region mode (S104) based on the operation information from the operation portion 64. When the selection of the mode is detected, the main control portion 62 supplies the VRAM 65a with the image data indicating the designation range Fb, and continues the live view display when the selection is not detected (S101). When the selection of the mode is detected, as shown in FIG. 12, the live view image is displayed together with the AF range Ff and the designation range Fb on the LCD 311.

A user operates the ten key 314 and the like and operates the push button 315 and the like so as to move a region (a distance), where they want to add the shading, on the live view image by the designation range Fb, and designate the region as the shading region. The main control portion 62 moves the designation range Fb on the live view image depending on the operation information moving the designation range Fb, and acquires information designating the shading region depending in the operation information designating the shading region.

Figure 12:
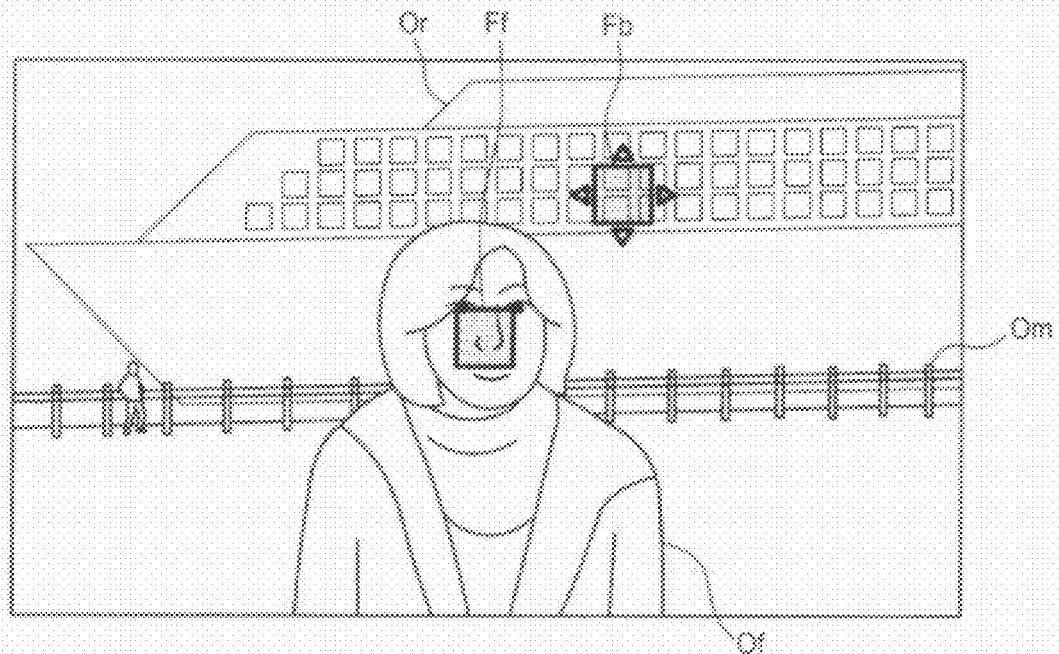
FIG. 12 is a diagram that shows a designated example of a shading region.

In the preview image shown in FIG. 12, a subject Of is captured in the front view, a subject Om is captured in the middle view, and a subject Or is captured in the background, and the focus is on the subject Of. Moreover, the subject Of is designated by the AF range Ff, and the subject Or is designated by the designation range Fb as the shading region.

The main control portion 62 initializes the adjustment value for adjusting a shading addition level (S105). The initial value of an F adjustment value ΔF used for adjusting the addition level of the optical shading and the initial value of a σ adjustment value Δσ used for adjusting the electronic shading addition level are set as, for example, ΔF=0 and Δσ=0, and are reset upon the adjustment of the addition level.

The phase difference AF calculation circuit 77 obtains the distance to the subject for each AF area Ef on the reference image (S106). The main control portion 62 obtains the distance (the shading distance Db) to the subject of the shading region and the distance to the focused main subject (the focal distance Df) from the distance to the subject for each AF area Ef. Herein, the reference image is an image (a still image) that is displayed as the live view image when the shading region is designated.

The distance for each AF area Ef can be obtained from the defocus amount Dd to the subject for each AF area Ef based on the optical characteristic of the exchangeable lens 2. The shading distance Db can be obtained as the distance of the AF area Ef corresponding to the designated shading region, and the focal distance Df can be obtained as the AF area Ef corresponding to the focused main subject. In addition, when a plurality of the AF areas Ef is included in the shading region, the shading distance Db is obtained as the multi number value, the average value or the like of the distance of the plurality of AF area Ef.

Figure 13:
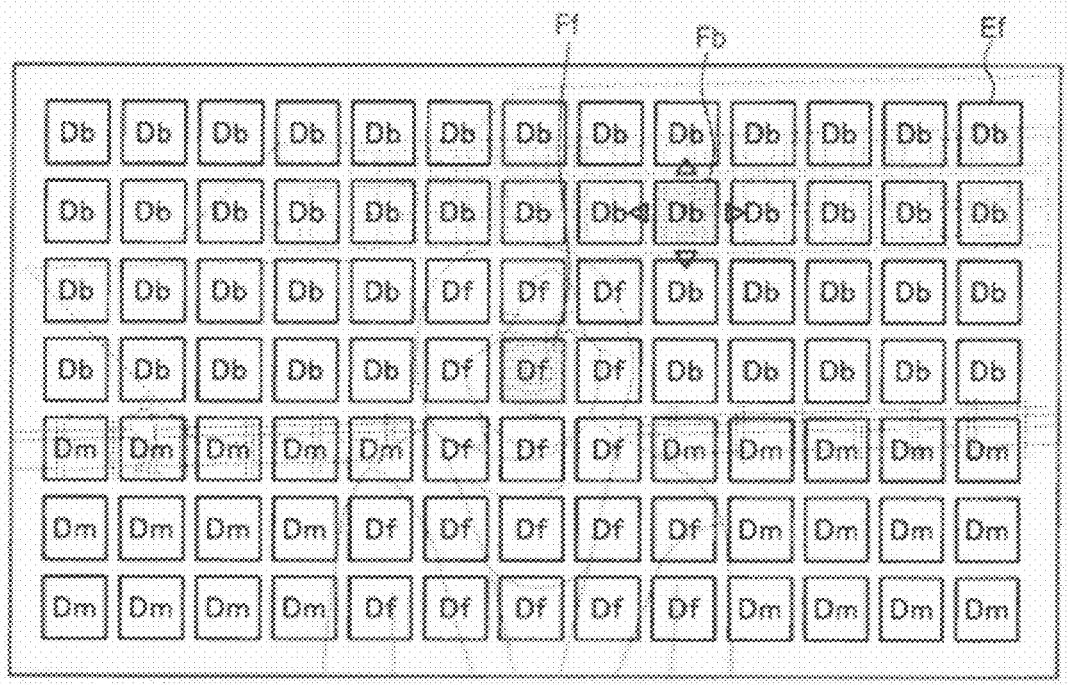
FIG. 13 is a diagram that shows a distance measurement example for each AF area Ef.

FIG. 13 shows a distance measurement example for each AF area Ef. FIG. 13 schematically shows the corresponding relationship between the photographic image and the AF area Ef. In the example shown in FIG. 13, the distance to the subject Of is measured as the focus distance Df the distance to the subject Om is measured as the middle distance Dm, and the distance to the subject Or is measured as the shading distance Db. In the present embodiment, focal distance Df<middle distance Dm<shading distance Db.

The main control portion 62 discriminates the current photographing mode that is set through the operation portion 64 of the mode setting dial 305 or the like (S107). Moreover, if the lens driving is the photographing mode (a still image photographing mode or the like) that can follow the photographing speed, the processing after step S108 is executed. Meanwhile, if the lens driving is the photographing mode (a motion picture photographing mode, the continuous photographing mode or the like) that is difficult to follow the photographing speed, the processing after step S112 is executed.

Firstly, a case will be described where the followable mode is discriminated inn step S107. In this case, the main control portion 62 performs the processing for creating the optical shading image added with the optical shading.

The main control portion 62 obtains the optical shading determination value ΔD and the threshold value ΔDt so as to determine whether or not the optical shading can suitably be added (S108). Specifically, the main control portion 62 obtains the front and rear depth of field from formula (3) and (4). Herein, the front depth of field is a range in which it appears that the focus is met among the range near the lens further than the subject, and the rear depth of field is a range in which it appears that the focus is met among the range near the endless circle further than the subject. The allowance blur circle is a constant from 1/1,000 to 1/1,500 of the diagonal length of the imaging device 101 screen. The focal distance Df is a distance from the lens to the focused main subject. The focus distance is a distance from the lens to the imaging device 101. The F value is an aperture value.

$$\text{front depth of field} = \frac{\text{allowance blur circle} \times F \text{ value} \times \text{focal } distance^2}{\text{focus } distance^2 + \text{alloance blur circle} \times F \text{ value} \times \text{focal distance}} \quad (3)$$

$$\text{rear depth of field} = \frac{\text{allowance blur circle} \times F \text{ value} \times \text{focal } distance^2}{\text{focal } distance^2 - \text{allowance blur circle} \times F \text{ value} \times \text{focal distance}} \quad (4)$$

The main control portion 62 obtains the determination value ΔD from formula (5). Herein, the shading distance Db is a distance from the lens to the subject of the shading region, and is obtained based on the distance to the subject of the AF area Ef corresponding to the shading region.

Determination value ΔD=shading distance Db−focal distance Df−rear depth of field(shading distance Db>focal distance Df)=shading distance Db−focal distance Df−front depth of field(shading distance Db<focal distance Df) (5)

The main control portion 62 obtains the shading threshold value ΔDt that is an index deciding whether or not the optical shading can suitably (sufficiently) be added from formula (6). Herein, the parameter α (α>1) in formula (6) is a parameter set so as to add an ideal shading, and is set as a default value.

Shading threshold value ΔDt=rear depth of field×α (shading distance Db>focal distance Df)=front depth of field×α(shading distance Db<focal distance Df) (6)

For example, when assuming that the distance wanting to add the shading is 10,000 mm, the allowance blur circle is 0.02 mm, F value is 2.8, the focal distance Df is 2,000 mm, and the focus distance 28 mm, the rear depth of field is 333 mm, and the parameter α is set as α=10,000/333−30 using formula (4).

Figure 14:
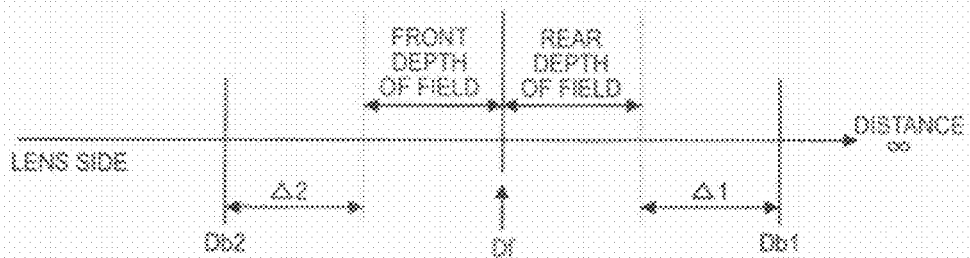
FIG. 14 is a diagram for describing the optical shading processing.

FIG. 14 indicates the relationship between the determination value ΔD and the shading threshold value ΔDt depending on the large and small relationship between the focal distance Df and the shading distance Db. When Db>Df (the shading distance Db1), the determination value ΔD is a difference ΔD1 between the distance of the most endless circle side of the depth of field and the shading distance Db. When Db<Df (the shading distance Db2), the determination value AD is a difference ΔD2 between the distance nearest the depth of field and the shading distance Db.

The main control portion 62 obtains the F value (the aperture value) satisfying the condition of formula (7) based on formula (5) and (6). The main control portion 62 substitutes the F value satisfying the condition of formula (7) to formula (8) to obtain the objective F value.

the determination value ΔD=shading threshold value ΔDt (7)

objective F value=F value−F adjustment value (8)

Moreover, the main control portion 62 determines whether or not the optical shading can suitably (sufficiently) be added by comparing the obtained objective value F with the minimum value F that can respond by the exchangeable lens 2. Herein, if the objective F value is equal to or greater than a minimum F value, the optical shading can suitably (sufficiently) be added, and if the objective F value is less than a minimum F value, it is difficult to suitably add the optical shading.

Herein, although the additional level of the optical shading was adjusted as mentioned below, in some cases, it is difficult to suitably add the optical shading. In this case, the objective F value is less than the minimum F value, and the F adjustment value ΔF is equal to or greater than the initial value. Moreover, when attempting to suitably add the shading, the electronic shading is added instead of the optical shading. For this reason, before adding the electronic shading, the adjustment value Δσ of the electronic additional level may be set to be greater than the initial value. As a result, even when the optical shading is converted to the electronic shading, the additional level of the electronic shading can suitably be adjusted.

When the optical shading can suitably be added ("Yes" in S109), the main control proton 62 performs the processing after step S110 so as to create the shading image added with the optical shading. Meanwhile, when it is difficult to suitably add the optical shading ("No" in S109), the imaging apparatus 1 performs the processing after step S112 so as to create the shading image added with the electronic shading.

When the optical shading can suitably be added, the main control portion 62 adjust the aperture 23 based on the F adjustment value ΔF (S110). The main control portion 62 creates the control signal for adjusting the F value to the objective F value and supplies the aperture driving control portion 76A with the control signal. The aperture driving control portion 76A creates the driving control signal based on the control signal, and the aperture driving mechanism 27 adjusts the aperture diameter of the aperture 23 by the driving force given from the aperture actuator 76M based on the driving control signal.

Moreover, in the imaging apparatus 1, the optical shading image is created (S111). The imaging device 101 performs the imaging operation in the state in which the F value is adjusted to the objective F value, the AFE 5 creates the image data from the image signal, and the image processing portion 61 processes the image data and the image memory 614 with the image data.

Next, in step S107, a case will be described where the follow-impossible mode is discriminated. In this case, the main control portion 62 performs the processing for creating the electronic shading image added with the electronic shading.

The imaging device 101 supplies the image signal to the AFE 5 in the photographing condition temporarily fixed in the photographing operation of step S103. The AFE 5 supplies the image data to the image processing portion 61. The image processing portion 61 supplies the image data after the image processing to the image memory 614. The main control portion 62 transmits the image data from the image memory 614 to the VRAM 65a, and the LCD 311 displays the image before adding the electronic shading. In the image memory 614, the image before adding the electronic shading is memorized.

The main control portion 62 adds the electronic shading to the image data using the electronic shading circuit 78. The electronic shading circuit 78 processes the image data using a shading filter such as a Gaussian filter indicated in formula (9). As the size of the filter, for example, 20×20 pixels are applied. Herein, x and y are positions of the pixels in the photographic image. σ is a filter factor (>0).

$$f(x, y) = \left(\frac{1}{2}\pi \times \delta^2\right) \exp\left(-\frac{x^2 + y^2}{2 \times \delta^2}\right) \qquad (9)$$

The main control portion 62 adjusts the image base on the electronic shading (S112). The main control portion 62 obtains the factor σ depending on the distance for each AF area Ef and supplies the factor to the electronic shading circuit 78. The factor σ for each distance is obtained, for example, by setting a factor of the focal distance Df to σ≅0, setting a reference factor σb of the shading distance Db to σb=σi+Δσ, and performing a linear interpolation from the focal distance Df to the endless circle. Herein, σi is an initial factor of the shading distance Db and is set as a default value (σi=0.8 and the like). Δσ is an adjustment value σ of the electronic shading, is set as an ideal value, and is reset by an additional level adjustment processing described later.

Moreover, in the imaging apparatus 1, the electronic shading image is created (S113). The electronic shading circuit 78 is accessed to the image memory 614, applies the filter, in which the factor σ is changed, to the image data for each AF area Ef, and adds the electronic shading to the image data. Moreover, the electronic shading circuit 78 memorizes the data of the electronic shading image in the image memory 614.

Figure 15:
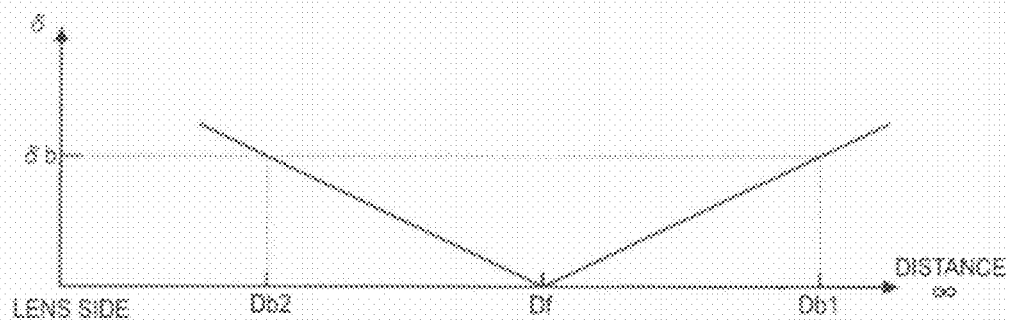
FIG. 15 is a diagram for describing the electronic shading processing.

FIG. 15 shoes a relationship between the distance and the factor σ depending on the magnitude correlation between the focal distance Df and the shading distance Db. When Db>Df (the shading distance Db1), the factor σ becomes larger value as it reaches the endless edge. When Db<Df (the shading distance Db2), the factor σ becomes the larger value as it reaches the lens.

When creating the shading image, the imaging apparatus 1 performs the preview display of the shading image (S114). In the preview display, a level meter LM indicating the shading additional level of the shading of the current point of time is displayed together with the shading image. A user confirms whether or not the shading is suitably added based on the shading image and the level meter LM.

The main control portion 62 transmits the image data from the image memory 614 to the VRAM 65a. Furthermore, the main control portion 62 supplies the VRAM 65a with the image data indicating the level meter LM accompanying the indicator L that indicates the current value of the F adjustment value ΔF or the σ adjustment value Δσ. As a result, the optical shading image or the electronic shading image is displayed on the LCD 311 together with the level meter LM.

Figure 16:
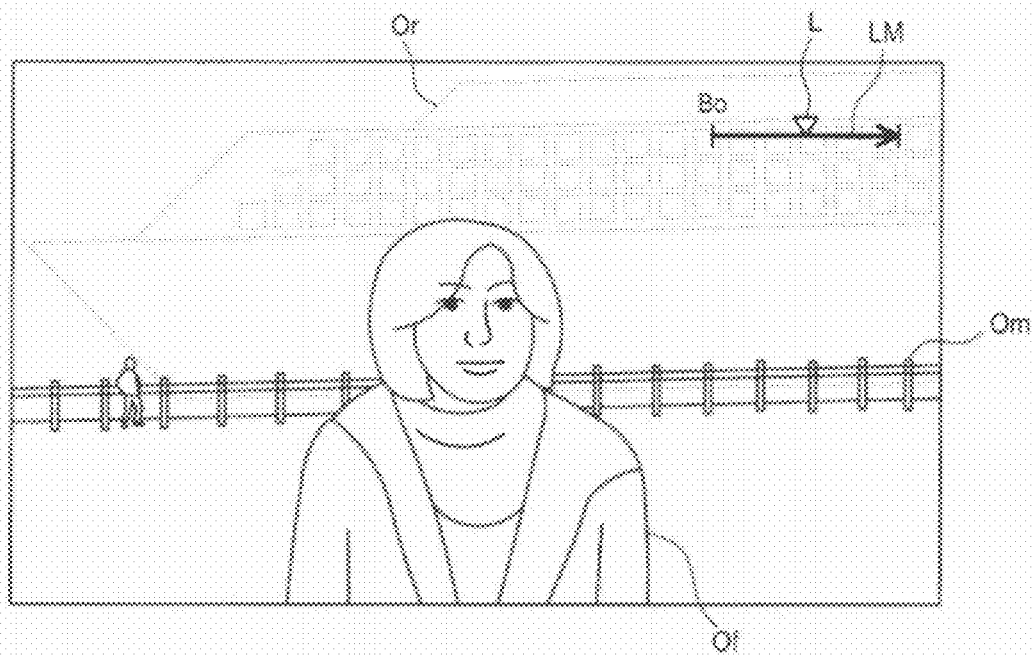
FIG. 16 is a diagram that shows an example of an image with the optical shading or the electronic shading added.

On the preview screen shows in FIG. 16, the shading image is displayed in which the optical shading is added to the shading region corresponding to the subject Or. Furthermore, as the level meter, a level bar of the F adjustment value ΔF or the optical shading Bo corresponding to a functional value of the F adjustment value ΔF is displayed. In addition, when adding the electronic shading, the level bar of the σ adjustment value Δσ or the electronic shading Be corresponding to the functional value of the σ adjustment value Δσ is displayed as the level meter LM.

When a user wants to adjust the shading additional level of shading by the preview screen, a user operates the setting button 312 or the like. The main control portion 62 determines the instruction of the adjustment (S115). Moreover, when the adjustment is instructed, the processing of step S116 is performed, and when the adjustment is not instructed, the processing of step S117 is performed.

When adjusting the additional level, a user operates the ten key 314 and the like so as to adjust the additional level, and then operates the push button 315 so as to determine the additional level. The main control portion 62 resets the F adjustment value ΔF or the σ adjustment value Δσ based on the operation information from the operation portion 64 (S116). Herein, when increasing the F adjustment value ΔF, the F value is decreased when creating the optical shading image after the adjustment, and the additional level of the optical shading is increased. Furthermore, when increasing the σ adjustment value Δσ, the filter strength hen creating the electronic shading image after the adjustment, and the additional level of the electronic shading is increased. As a result, the main control portion 62 executes the processing of step S106, that is, the processing after the distance measurement for each AF area Ef by the use of the changed F adjustment value ΔF or σ adjustment value Δσ.

When not adjusting the additional level, a user completely pushes the push button 307 so as to record the shading image. The main control portion 62 detect the full-pushing state based on the operation information input from the operation portion 64 (S117), and performs the image recording operation.

In the image recording operation, the main control portion 62 records the shading image by transmitting data of the optical shading image or the electronic shading image from the image memory 614 to the memory card 67 (S118). Furthermore, the main control portion 62 supplies the message indicating the recording completion of the shading image to the VRAM 65a. As a result, the message indicating the recording completion of the shading image is displayed on the LCD 311, and the data of the shading image is recorded in the memory card 67.

In the first embodiment, depending on the photographing condition, the optical shading or the electronic shading is added to the photographic image. Thus, when the optical shading can be added, the F value is adjusted and the analog (soft) optical shading is added. As a result, compared to the electronic shading that is added for each region of the photographic image in a digital manner (step manner), the natural shading image can be created. Furthermore, by jointly using the distance detection of the phase difference detection method, the distance information higher than the distance detection of the related art is acquired, and thus, the quality of the shading image can be improved.

[6. Operation of Imaging Apparatus According to Second Embodiment]

Figure 17:
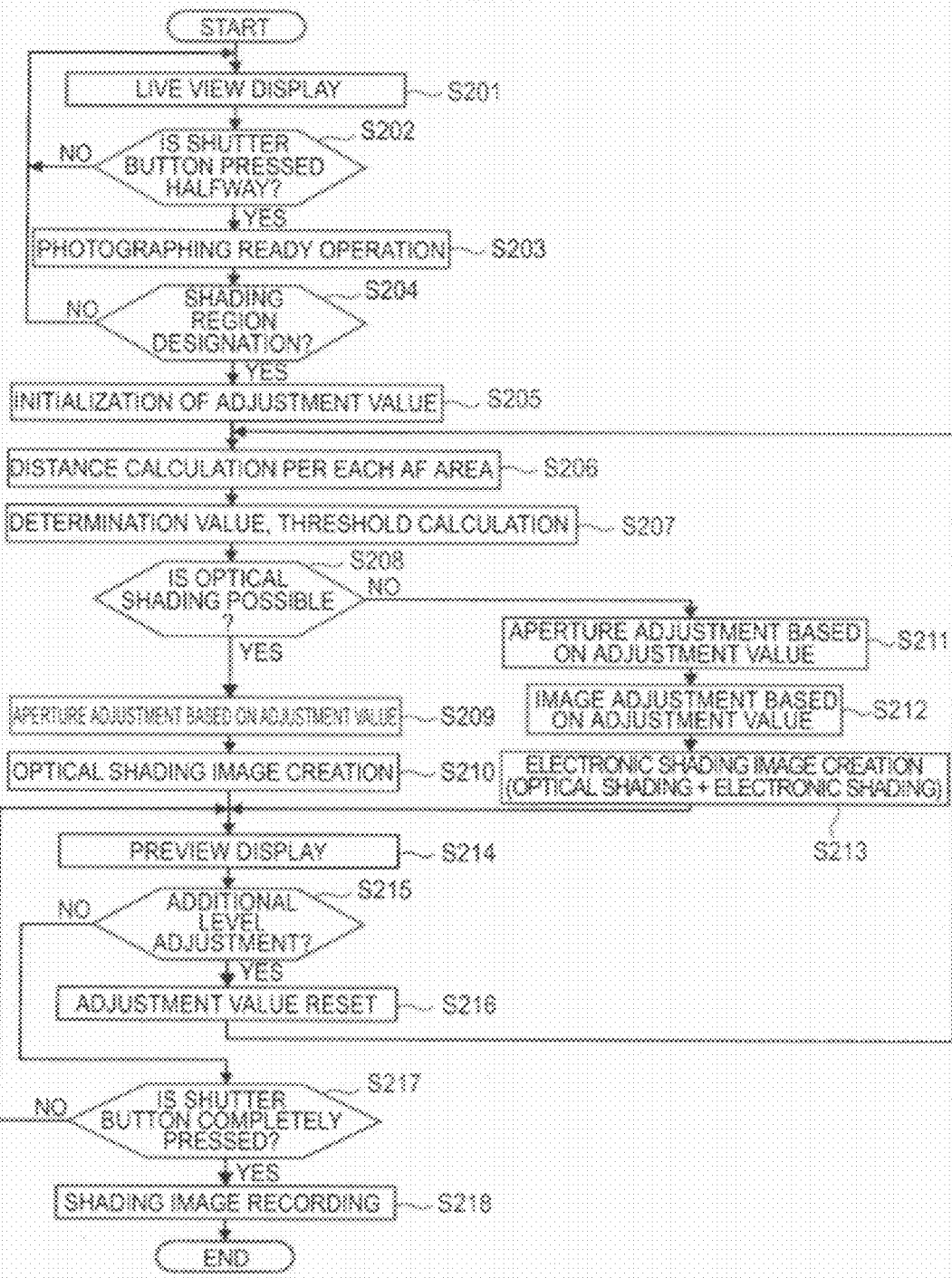
FIG. 17 is a flow chart that shows an operation of an imaging apparatus according to a second embodiment.

FIG. 17 is a flow chart that shows an operation of an imaging apparatus 1 according to a second embodiment. In the second embodiment, regardless of the photographing mode, when it is difficult to add the suitable (sufficient) shading by the optical shading, the optical shading and the electronic shading are jointly used. Hereinafter, the description overlapping with the first embodiment will be omitted.

The Processing of steps S201 to S206 and S214 to S218 of the second embodiment correspond to the processing of steps S101 to S106 and S114 to S118 of the first embodiment. Thus, hereinafter, the processing of steps S207 to S213 will be described.

When obtaining the distance for each AF area Ef in step S206, the main control portion 62 obtains the optical shading determination value ΔD and the threshold value ΔDt without discriminating the photographing mode unlike the first embodiment (S207). The main control portion 62 obtains the determination value ΔD and the threshold value ΔDt from formula (5) and (6) like the first embodiment, and obtains the objective F value based on formula (7) and (8).

Moreover, the main control portion 62 determines whether or not the optical shading is possible by comparing the objective F value with the minimum F value (S208). When the main control portion 62 determines that the objective F value is equal to or greater than the minimum F value and the optical shading can suitably (sufficiently) be added, the main control portion 62 performs the optical shading processing. In this case, the main control portion 62 adjusts the aperture 23 based on the F adjustment value ΔF to perform the imaging operation like the first embodiment (S209), thereby creating the optical shading image (S210).

Meanwhile, when it is determined that the objective F value is less than the minimum F value and it is difficult to suitably (sufficiently) add the optical shading, the optical shading and the electronic shading are jointly used. In this case, firstly, the main control portion 62 rests the objective F value to the minimum F value and adjusts the aperture so as to satisfy the objective F value as much as possible (S211). Next, the main control portion 62 adjusts the image based on the σ adjustment value Δσ(S212). The main control portion 62 adds the electronic shading to the photographic image while changing the factor for each AF area Ef by the use of the electronic shading circuit 78, thereby creating the shading image in which the optical shading and the electronic shading are jointly used (S213).

Moreover, when creating the shading image, the imaging apparatus 1 performs the preview display of the shading image (S214). In the preview display, the level meter LM indicating the shading additional level of the shading in the current point of time is displayed together with the shading image. In the second embodiment, the level meter LM is displayed which indicates the shading additional level so as to be distinguished into the optical shading and the electronic shading.

Figure 18:
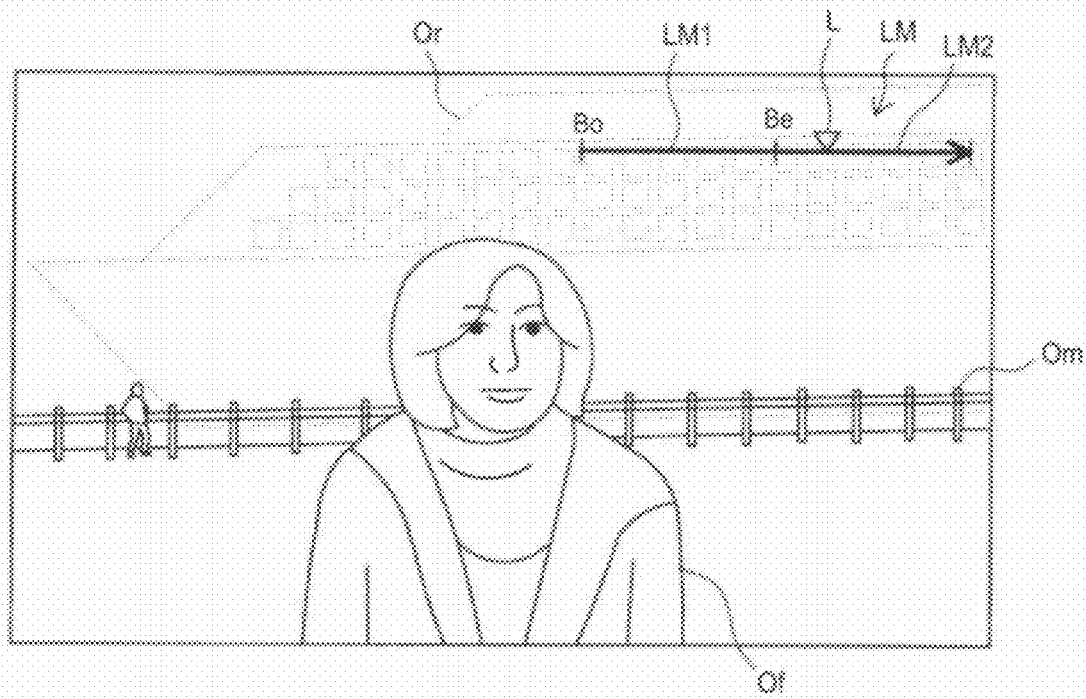
FIG. 18 is a diagram that shows an example of an image with the optical shading or the electronic shading added.

As shown in FIG. 18, the imaging apparatus 1 displays the preview screen of the shading image on the LCD 311. On the preview screen shown in FIG. 18, in the shading region corresponding to the subject Or, the shading image is displayed in which the shading is added by the combined processing. Furthermore, the level meter LM is displayed in which the level bar LM1 corresponding to the maximum additional level of the optical shading Bo is combined with the level bar LM2 corresponding to the maximum additional level of the electronic shading Be. Herein, the maximum additional level of the optical shading is equivalent to the maximum value of the F adjustment value ΔF and is set as the function of the minimum F value that can respond by the exchangeable lens 2. The maximum additional level of the electronic shading is equivalent to the σ adjustment value Δσ, and is set as a function of the application range of the shading filter.

In the level meter LM, the current additional level is indicated by the indicator L. In the level meter LM, the additional level is indicated which transits from the optical shading "weak" to the optical shading "strong", and transits from the electronic shading "weak" to the electronic shading "strong". In the example shown in FIG. 18, the additional level of the shading reaches the additional level "weak" of the electronic shading. The main control portion 62 executes the processing of step S206, that is, the processing after the distance measurement for each AF area Ef by the use of the changed F adjustment value ΔF or a adjustment value Δσagain.

In the second embodiment, depending on the photographing condition, the optical shading, or the optical shading and the electronic shading are added to the photographic image. Thus, even when it is difficult to sufficiently add the optical shading, the F value is adjusted in the possible range, the optical shading is added, the image is adjusted in the remaining range, and the electronic shading is added. As a result, even when it is difficult to sufficiently add the optical shading, compared to the case of adding only the electronic shading, the natural shading image can be created. Furthermore, by jointly using the distance detection of the phase difference detection method, the distance information having the accuracy higher than the distance detection of the related art is acquired, and thus, the quality of the shading image can be improved.

[7. Operation of Imaging According to Third Embodiment]

FIG. 19 is a flow chart that shows an operation of an imaging apparatus 1 according to a third embodiment. In the third embodiment, when a mode (the motion picture photographing mode, the continuous photographing mode or the like) is selected in which the lens driving is hard to follow the photographing speed, the electronic shading processing is performed using the distance detection of the phase difference detection method.

In addition, the processing of steps S301 to S306 and S309 to S313 of the third embodiment correspond to the processing of steps S101 to S106 and S114 to S118 of the first embodiment. Thus, hereinafter, the processing in steps S305 to S308 will be described.

In step S306, the distance to the subject for each AF area Ef is obtained using the distance detection of the phase difference detection method. Then, the main control portion 62 adjusts the images based on the σ adjustment value Au without performing the discrimination of the photographing mode, and the calculation of the optical shading determination value ΔD and the threshold value ΔDt unlike the first embodiment (S307). The main control portion 62 adds the electronic shading to the photographic image while changing the factor σ for each AF area Ef using the electronic shading circuit 78, thereby creating the electronic shading image (S308).

In the third embodiment, the phase difference detection signal, which is output from the imaging device 101 simultaneously with the image signal, is acquired, and the distance information for each AF area Ef is obtained. For this reason, the distance information of high accuracy can be acquired compared to the distance detection of the related art in which the focus lens 211 is driven during AF operation, the focal position for each detection region is detected, and the distance information is obtained. Moreover, by dividing the photographing region based on the distance information of the high accuracy and adding the electronic shading for each region, it is possible to create the natural shading image in which the boundary between the divided regions is inconspicuous.

As mentioned above, preferred embodiments of the present disclosure are described with reference to the accompanying drawings, but the present disclosure is not limited to the examples. It is apparent that those skilled in the art can represent various modifications or alterations within the scope of the technical idea described in the appended claims, and it is understood that such modifications and alterations of course fall within the technical scope of the present disclosure.

For example, in the description above, in the first and second embodiments, a case was described where the detection of the phase difference detection type is jointly used. However, instead of jointly using the distance detection of the phase difference detection method, the distance detection of the related art may be used. Even in this case, by adding the optical shading or adding the optical shading and the electronic shading depending on the photographing condition, compared to the case of adding only the electronic shading, the natural shading image can be created.

Furthermore, in the description above, a case was described where the optical shading is added based on the relationship between the shading determination value $\Delta D$ and the threshold value $\Delta Dt$. However, in regard to the shading region, the frequency component of the photographic image is analyzed, when the low frequency component is low, it may be determined that the shading is not sufficiently added, and in the opposite case, it may be determined that the shading is sufficiently added, and the optical shading may be added.

Furthermore, in the description above, a case was described where the operation input such as the designation of the shading region is performed using an operator such as the setting button 312 and the ten key 314. However, by constituting the LCD 311 as the touch panel, the operation input may be performed on the LCD 311.

The present disclosure contains subject matter related to that disclosed in Japanese Priority Patent Application JP 2010-277207 filed in the Japan Patent Office on Dec. 13, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
    an imaging optical system having an aperture;
    an imaging device that outputs an image signal;
    an electronic shading processing portion, implemented by circuitry, that adds an electronic shading to a photographic image corresponding to the image signal; and
    a control portion, implemented by the circuitry, which determines whether or not an optical shading can be added to the photographic image based on a photographing condition, the control portion controlling the aperture and adding the optical shading when the optical shading can be added, and the control portion controlling the electronic shading processing portion and adding the electronic shading when it is difficult to add the optical shading.

2. The imaging apparatus according to claim 1,
    wherein the control portion controls the aperture, adds the optical shading in a range capable of responding to the imaging optical system, controls the electronic shading processing portion, and adds the electronic shading in the remaining range, when it is difficult to add the optical shading.

3. The imaging apparatus according to claim 1,
    wherein the control portion calculates a shading determination value from a shading distance corresponding to a distance of a region added with the shading up to a subject, a focal distance corresponding to the distance up to the focused subject, and a depth of field based on the photographing condition, and calculates a shading threshold value from the depth of field and a shading reference value, and when the shading determination value does not satisfy the shading threshold value, the control portion determines that it is difficult to add the optical shading.

4. The imaging apparatus according to claim 1,
    wherein the control portion determines that it is difficult to add the optical shading to the photographic image in a motion picture photographing mode or in a continuous photographing mode.

5. The imaging apparatus according to claim 1, further comprising:
    a display device that displays the photographic image; and
    an operation device in which operation information for designating a region added with the shading in the photographic image is input.

6. The imaging apparatus according to claim 5,
    wherein the display device displays the photographic image added with the shading,
    the operation information for adjusting a degree of shading added to the photographic image is input to the operation device, and
    the control portion controls one of the aperture and the electronic shading processing portion based on the operation information, and adjusts the degree of the shading added to the photographic image.

7. The imaging apparatus according to claim 6,
    wherein the display device displays the degree of the shading added to the photographic image so as to be divided into the optical shading and the electronic shading.

8. The imaging apparatus according to claim 1,
    wherein the imaging device outputs a phase difference detection signal for calculating a distance information for each photographing region simultaneously with the image signal,
    the imaging apparatus further comprises a distance information calculation portion, implemented by the circuitry, that calculates the distance information for each photographing region based on the phase difference detection signal, and
    the control portion adds the shading to the photographic image based on the distance information for each photographing region.

9. A method of controlling an imaging apparatus comprising:
    determining whether or not an optical shading can be added to a photographic image based on a photographing condition;
    adding the optical shading by the adjustment elan aperture when the optical shading can be added; and
    adding electronic shading by the adjustment of the image processing when it is difficult to add the optical shading.

10. An imaging apparatus comprising:
    an imaging device that simultaneously outputs an image signal and a phase difference detection signal for each photographing region;
    a distance information calculation portion, implemented by circuitry, that calculates distance information for each photographing region based on the phase difference detection signal;
    an electronic shading processing portion, implemented by the circuitry, that adds an electronic shading to a photographic image corresponding to the image signal; and
    a control portion, implemented by the circuitry, that controls the electronic shading processing portion based on the distance information for each photographing region and adds the electronic shading to the photographic image.

11. The imaging apparatus according to claim 10, wherein the control portion adds the electronic shading to the photographic image in a motion picture photographing mode or in a continuous photographing mode.

12. A method of controlling an imaging apparatus comprising:
acquiring phase difference detection signals for each photographing region that is output simultaneously with an image signal;
calculating distance information for each photographing region based on the phase difference detection signals; and
adding electronic shading to the photographic image corresponding to the image signal, based on the distance information for each photographing region.

* * * * *